United States Patent [19]

Nakayama

[11] Patent Number: 5,790,403
[45] Date of Patent: Aug. 4, 1998

[54] LANE IMAGE PROCESSING SYSTEM FOR VEHICLE

[75] Inventor: Shigeto Nakayama, Saitama, Japan

[73] Assignee: Honda Giken Kogyo Kabushiki Kaisha, Tokyo, Japan

[21] Appl. No.: 501,232

[22] Filed: Jul. 11, 1995

[30] Foreign Application Priority Data

Jul. 12, 1994 [JP] Japan ................... 6-182940

[51] Int. Cl.[6] ................ G06F 165/00; G06K 9/36
[52] U.S. Cl. .................. 364/424.033; 364/460; 364/461; 340/937; 340/435; 340/436; 382/168; 382/199; 382/281; 348/118
[58] Field of Search ............ 364/424.027, 424.033, 364/447, 460, 461, 462, 436; 382/103, 104, 106, 168, 171, 199, 281; 340/437, 435, 436; 348/118

[56] References Cited

U.S. PATENT DOCUMENTS

| | | | |
|---|---|---|---|
| 4,970,653 | 11/1990 | Kenue | 364/461 |
| 5,220,508 | 6/1993 | Ninomiya et al. | 364/449.1 |
| 5,341,437 | 8/1994 | Nakayama | 382/104 |
| 5,359,666 | 10/1994 | Nakayama et al. | 382/104 |
| 5,369,590 | 11/1994 | Karasudani | 364/460 |
| 5,487,116 | 1/1996 | Nakano et al. | 364/423.098 |
| 5,517,412 | 5/1996 | Unoura | 364/424.027 |
| 5,530,771 | 6/1996 | Maekawa | 382/103 |
| 5,555,312 | 9/1996 | Shima et al. | 340/937 |
| 5,555,555 | 9/1996 | Sato et al. | 382/291 |

FOREIGN PATENT DOCUMENTS

| | | |
|---|---|---|
| 0361914 | 4/1990 | European Pat. Off. . |
| 95304855 | 2/1996 | European Pat. Off. . |
| 62-155140 | 7/1987 | Japan . |
| 1161403 | 6/1989 | Japan . |
| 3139706 | 6/1991 | Japan . |
| 3158976 | 7/1991 | Japan . |
| 436878 | 2/1992 | Japan . |

OTHER PUBLICATIONS

Davis et al., "Road Boundary Detection for Autonomous Vehicle Navigation", Optical Engineering, Mar. 1986, vol. 25, No. 3, pp. 409–414.

Image Analysis Handbook, p. 503, University of Tokyo Publishing Society (with attached brief explanation in English) (Year is not available).

Primary Examiner—Tan Q. Nguyen
Attorney, Agent, or Firm—Lyon & Lyon LLP

[57] ABSTRACT

A lane image processing system for a vehicle to recognize the lane on which the vehicle travels. The system has a CCD camera mounted on the vehicle for viewing a roadway scene ahead of the vehicle to output image data of the roadway scene including the lane on which the vehicle travels. Obstacles such as preceding vehicle are detected and a region for image data processing is determined so as to avoid the position of the obstacle and the lane on which the vehicle travels is recognized based on the processed result. More specifically, lane boundary positions estimated up to a preceding cycle are stored as historical information and in the region Hough transformation is limited in areas determined based on the historical information and the horizon in the roadway scene.

11 Claims, 51 Drawing Sheets

Estimated lane boundaries in actual plane

Estimated lane boundary on each side of vehicle and selected start and end points

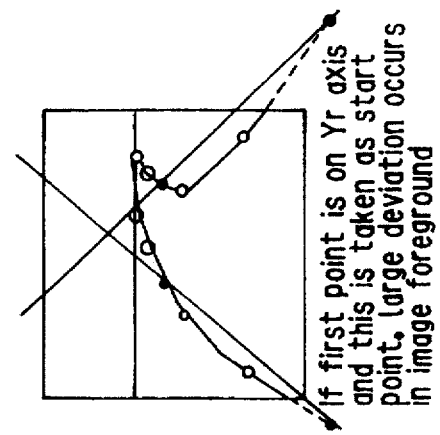
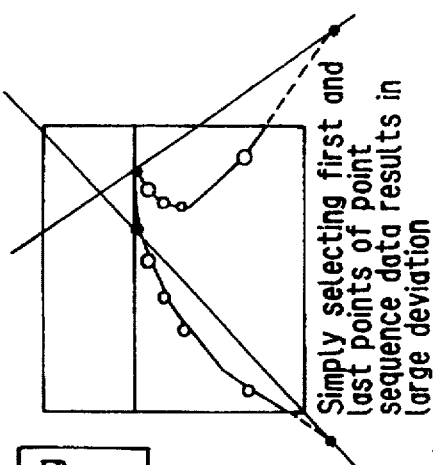
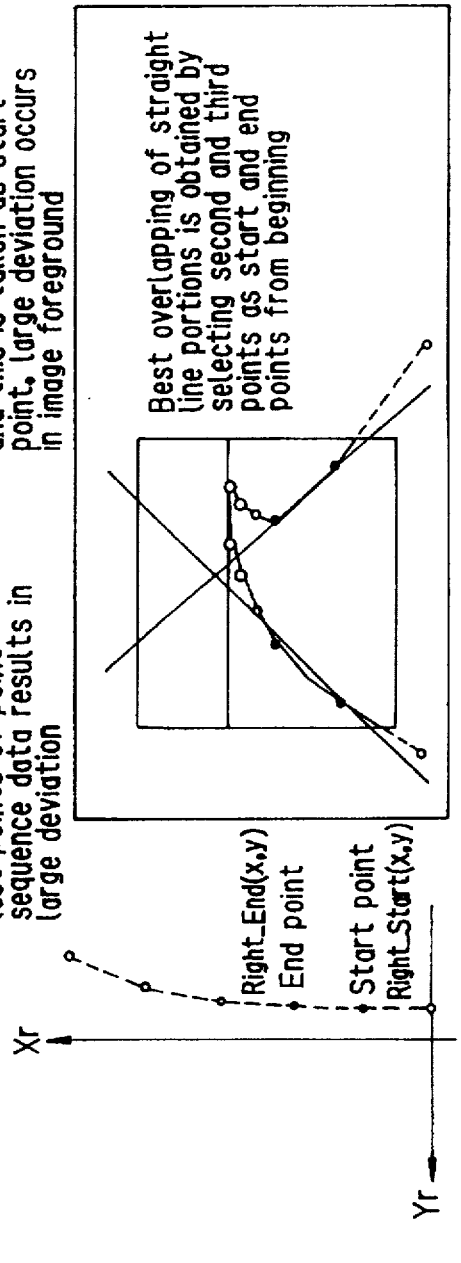
FIG. 10

FIG. 15
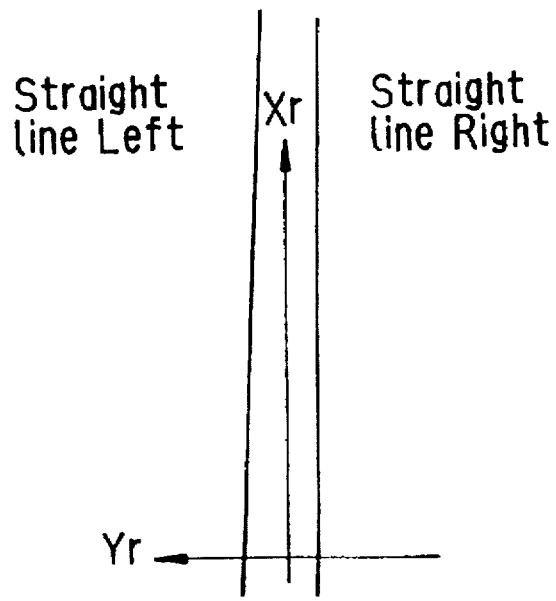
Actual plane coordinate system having vehicle position at current cycle image input time as its origin
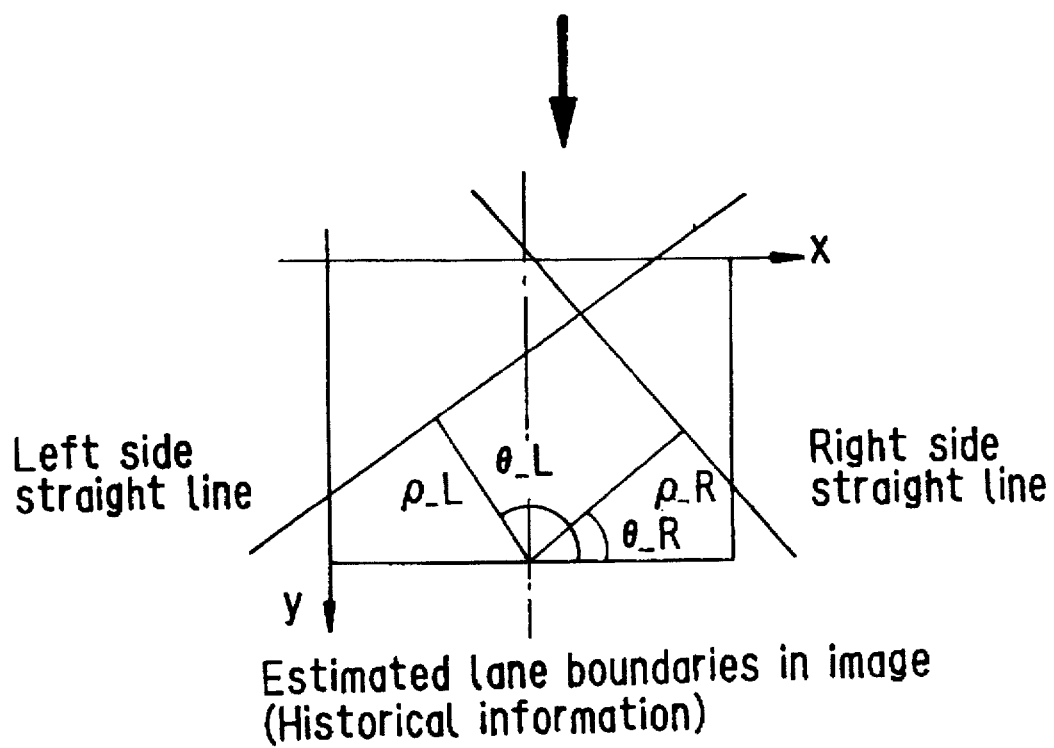
Estimated lane boundaries in image (Historical information)

Decision zone in image

Decision in camera field in actual plane

● : Obstacle in camera field
○ : Obstacle outside camera field

Fig. 24
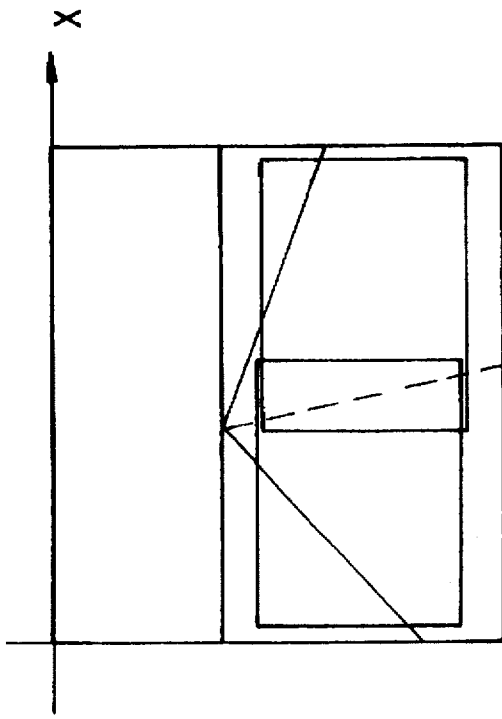
Fig. 24B
With middle overlap, the whole lane boundary can be detected in one or both of the left and right processing regions.
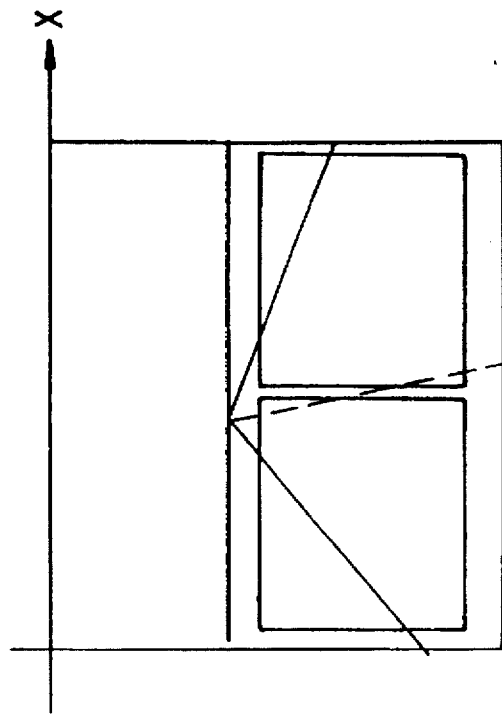
Fig. 24A
With no overlap at the middle, the Hough transformation detection peak becomes low when the vehicle straddles a lane boundary since the lane boundary is divided between the left and right processing regions.

FIG. 28
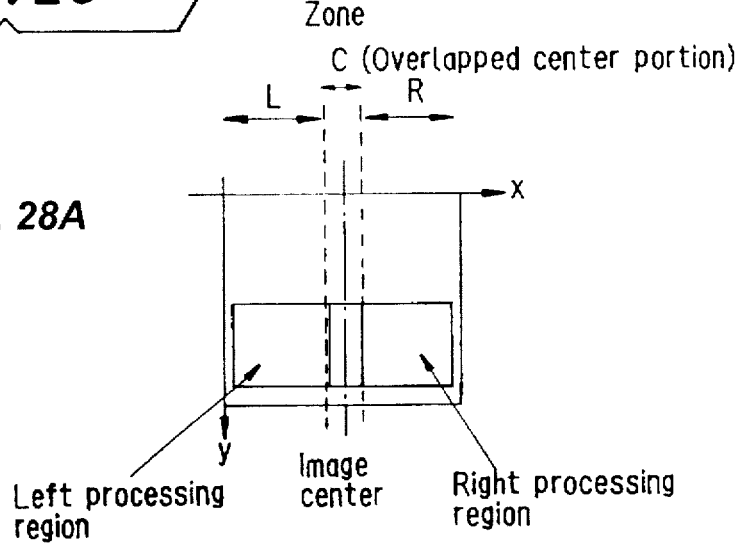
*Fig. 28A*
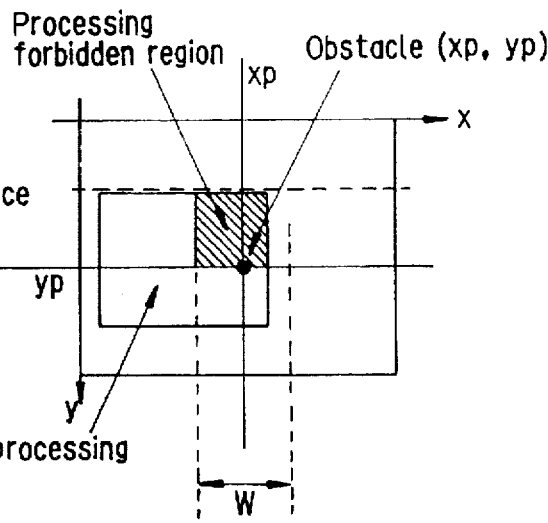
*Fig. 28B*
In this embodiment, W is calculated (using equation referred to earlier) as width in image corresponding to 2m (vehicle width plus allowance) at obstacle distance (position of yp in actual plane).
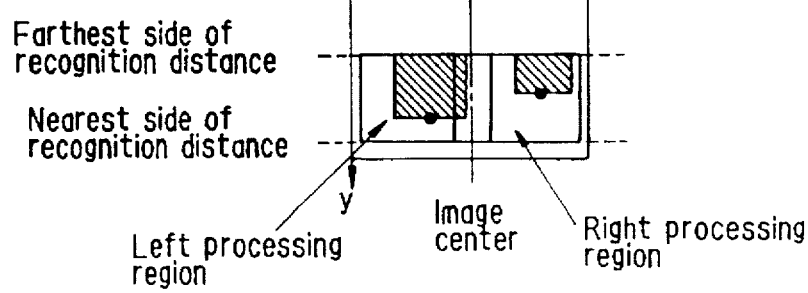
*Fig. 28C*

Processing regions when historical information is available but obstacle data are not Processing regions when $A\_R < 0$ In this embodiment, dx is 4 dots.

For avoiding the effect of edge detection processing and other such filtering, 8-dot margins are again provided at the left and right edges of the image.

Position in image of object in vehicle's lane

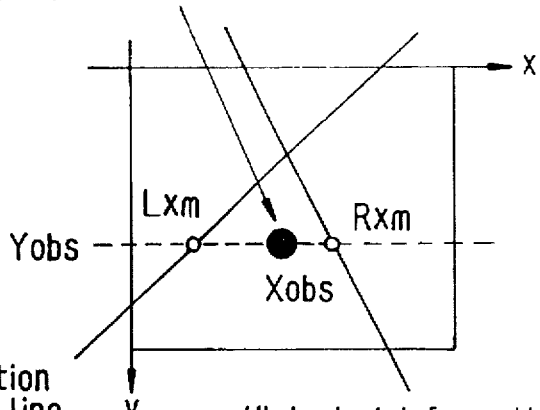

Historical information left side straight line (A_L, B_L)

Historical information right side straight line (A_R, B_R)

Fig. 33B

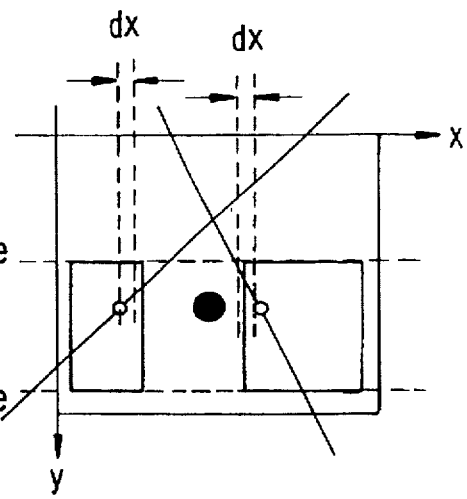

Farthest side of recognition distance

Nearest side of recognition distance

Processing regions when historical information and data on obstacle in vehicle's lane are available For avoiding the effect of edge detection processing and other such filtering, 8-dot margins are again provided at the left and right edges of the image. As earlier, dx is 4 dots.

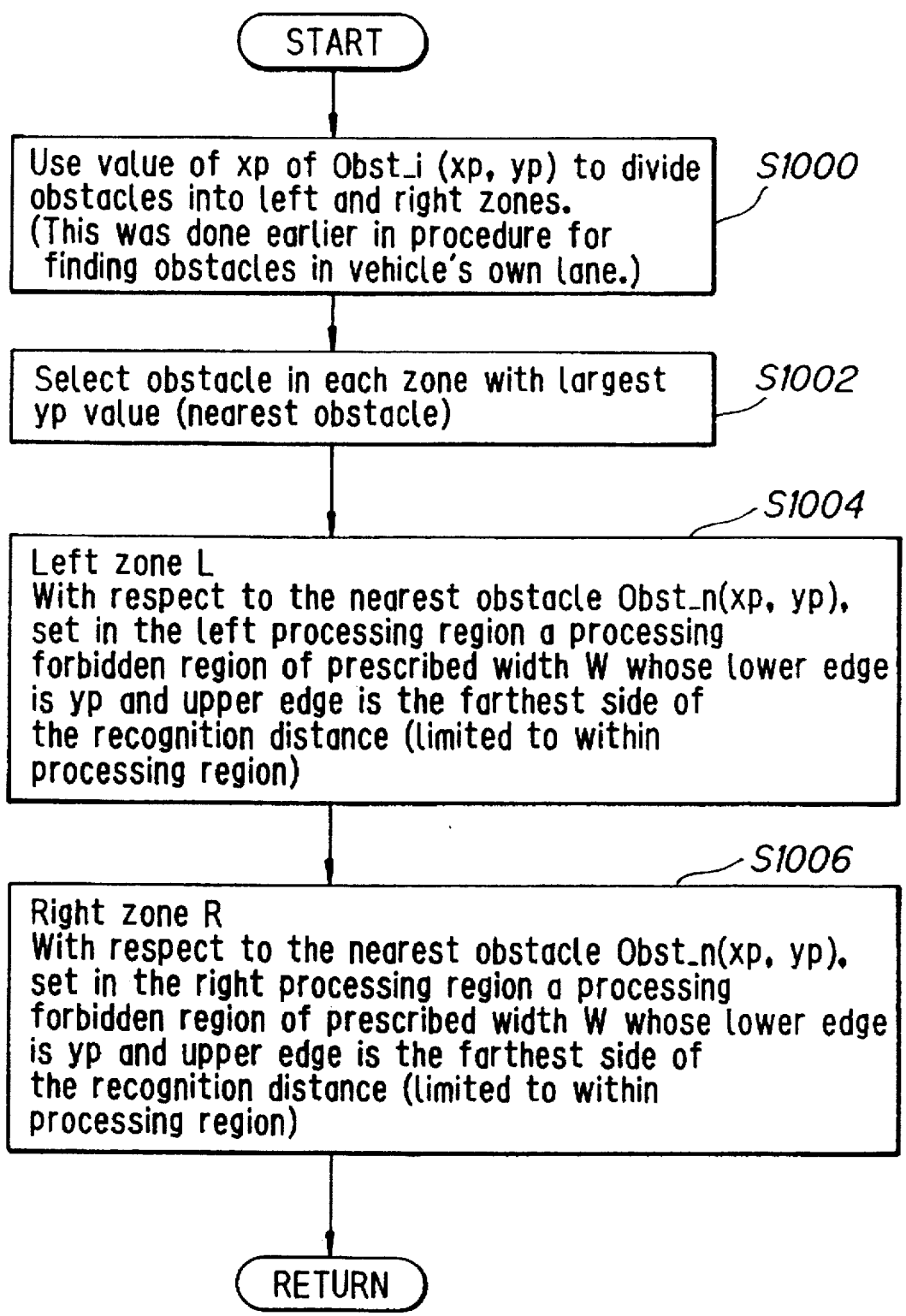

FIG. 35
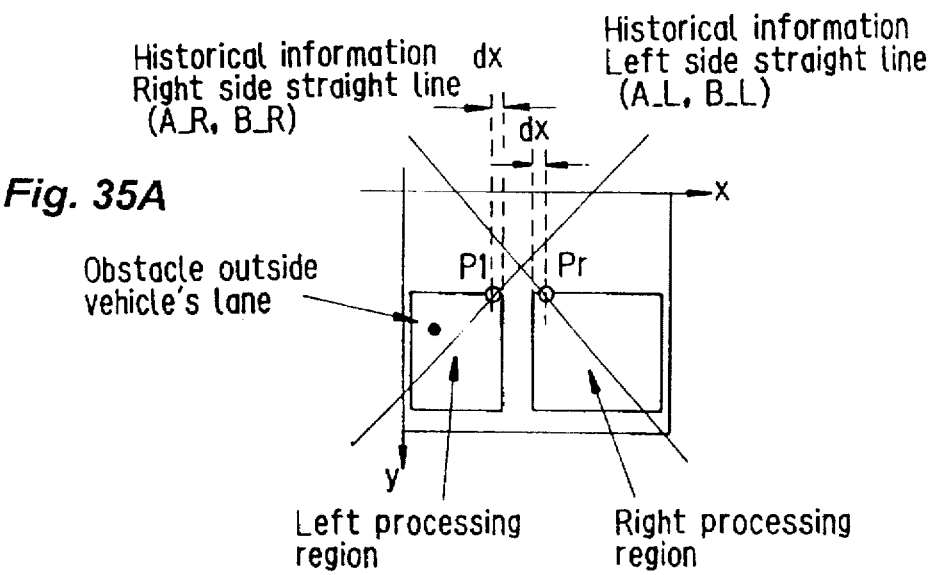
Fig. 35A
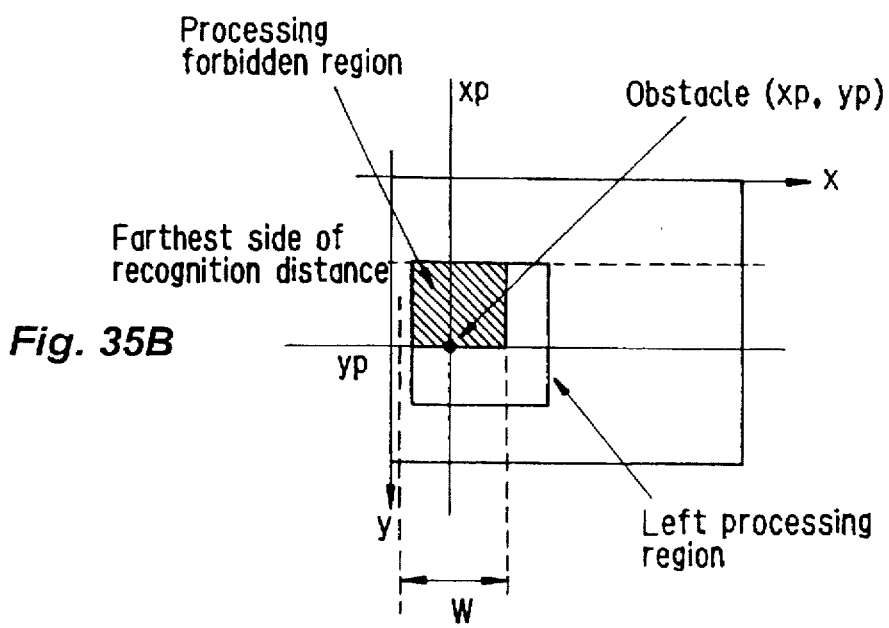
Fig. 35B
In this embodiment, W is calculated (using equation referred to earlier) as width in image corresponding to 2m (vehicle width plus allowance) at obstacle distance (position of yp in actual plane).

[Drawback of prior art]
FIG. 36
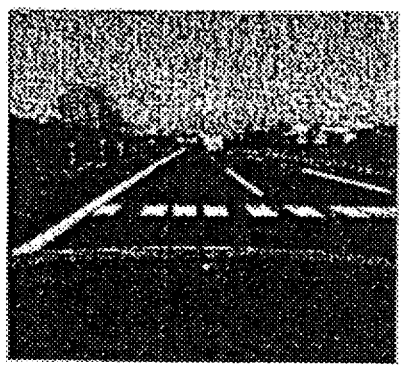
Original image
Fig. 36A
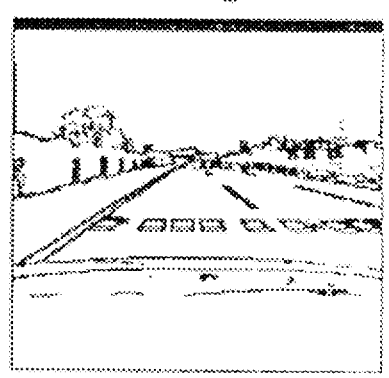
Edge image
Fig. 36B
Fig. 36C
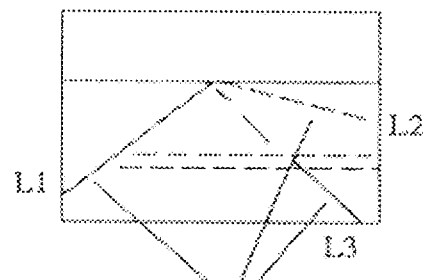
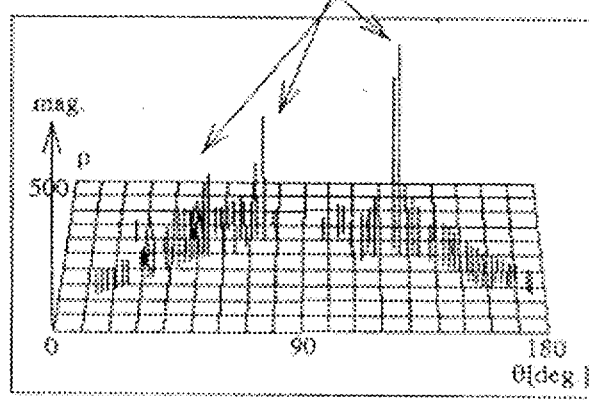
Hough transformation mapping plane

FIG. 38
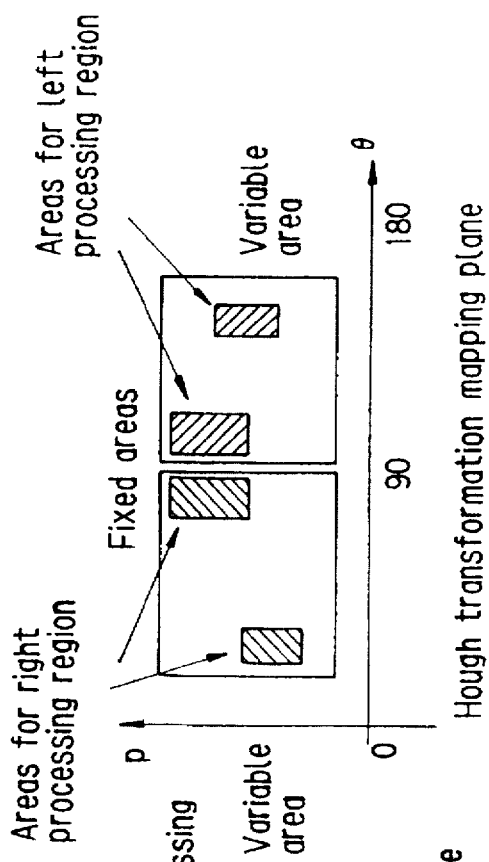
Fig. 38A
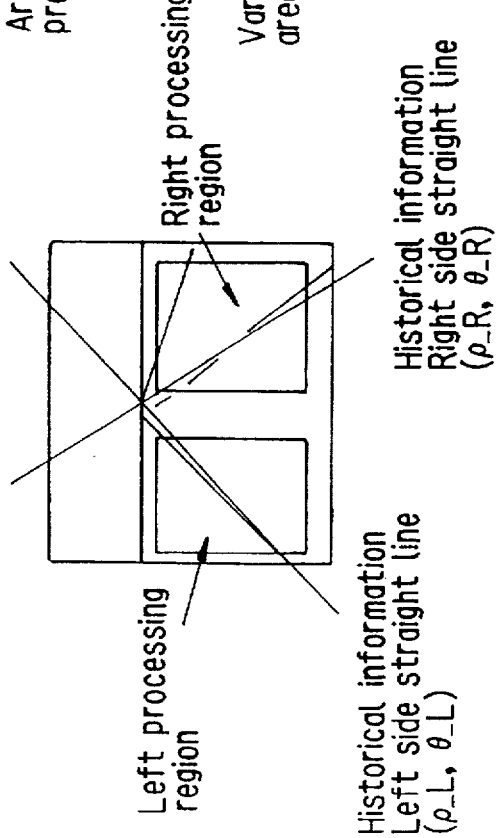
Fig. 38B

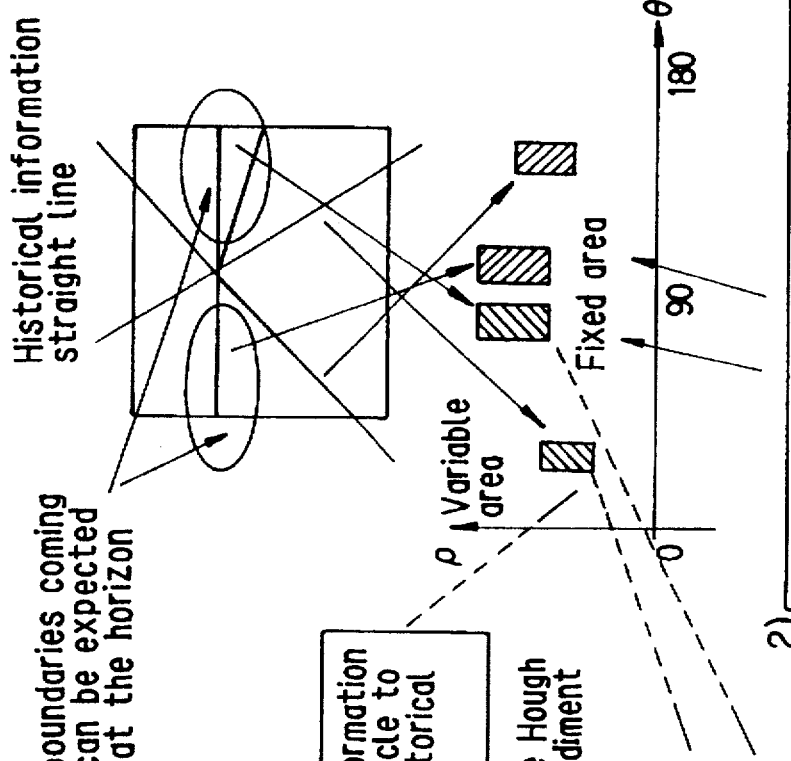

FIG. 39

[Outline of present method]

New lane boundaries coming into view can be expected to appear at the horizon

Specification of limits includes only 1) and 2)

1) Set sorting areas in Hough transformation mapping plane $(\rho, \theta)$ of current cycle to a prescribed width centered on historical information $(\rho, \theta)$ 3) is included in the functions of the Hough transformation hardware in this embodiment 3) Extract straight lines from the largest to fiftieth largest peaks in Hough transformation-processed variable and fixed areas 2) Since new road edges may be discovered at values of $\theta$ in vicinity of 90 [deg], permanently set sorting areas at fixed widths Hough transformation mapping plane

FIG. 41
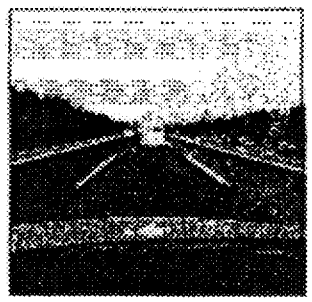
Original image
Fig. 41A
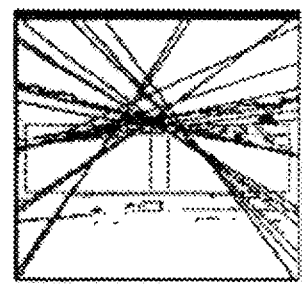
Group of straight lines obtained by Hough transformation
Fig. 41B
Fig. 41C
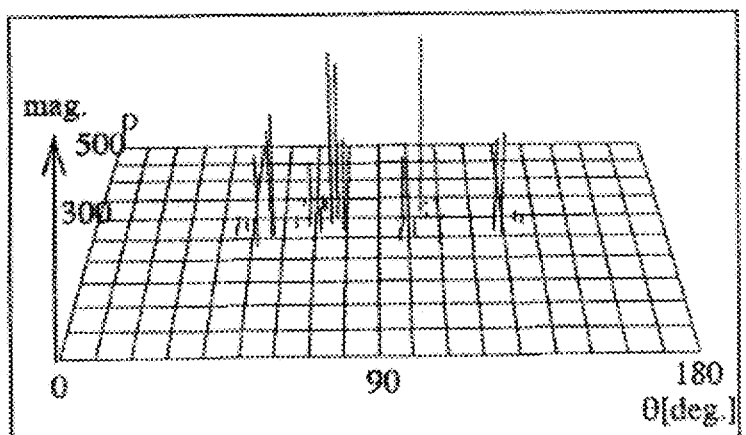
Peaks in Hough transformation mapping plane FIG. 44
Two-lane highway with center broken line
Fig. 44A
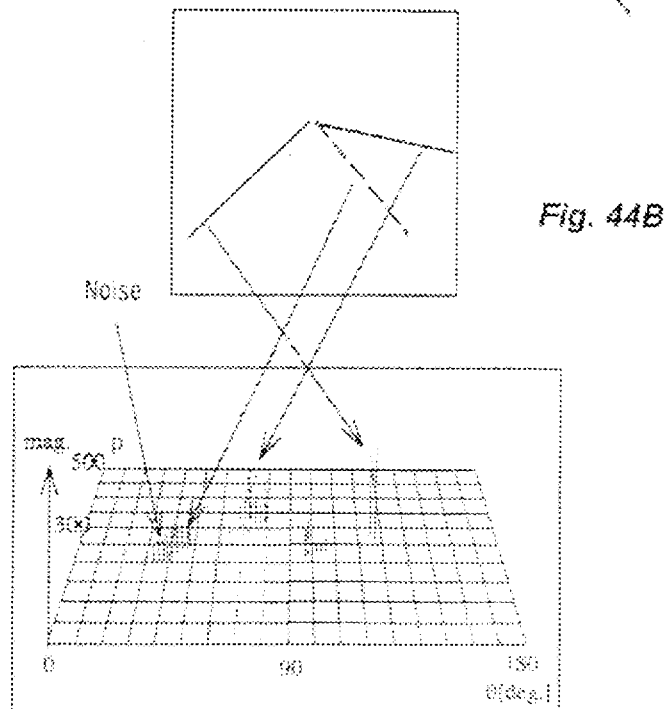
Fig. 44B
Hough transformation mapping plane

FIG. 45

[Procedure of the present method]

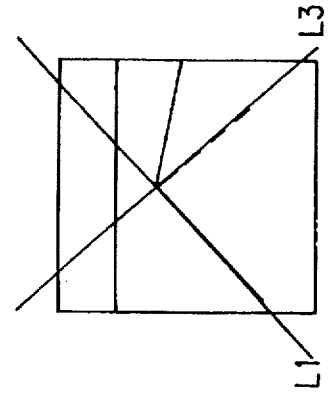

Straight lines nearest vehicle are found from among those selected by clustering L1 in the above diagram

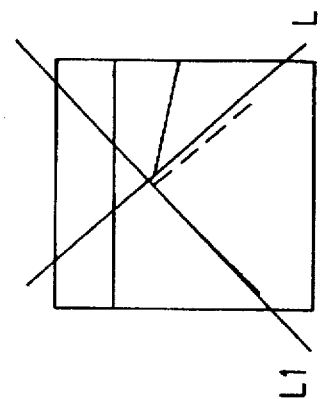

Opposing estimated straight line at a distance equal to prescribed road width is calculated Calculate straight line L opposed to L1 on right side of vehicle

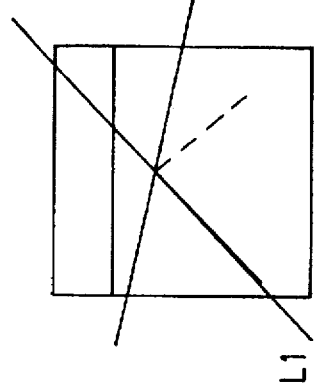

Find straight line near L3 by searching Hough transformation results down to the smaller peaks Noise is not picked up even if search is extended to small peaks In the present embodiment the initial road width value is set at 3.5m, the lane width prescribed for expressways by the Japanese Road Structure Ordinance

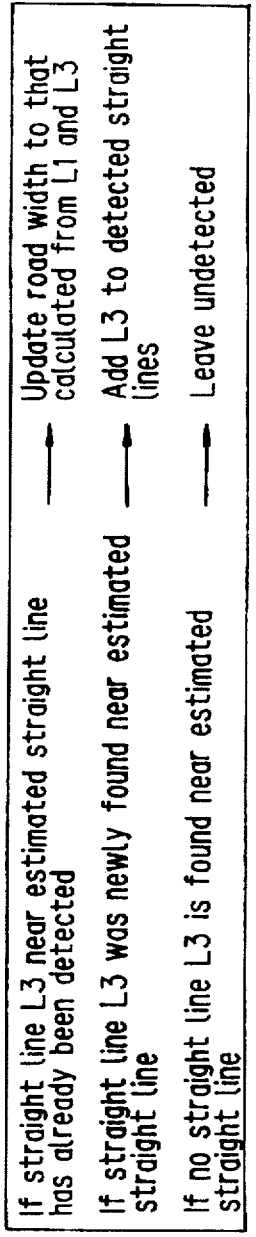

If straight line L3 near estimated straight line has already been detected → Update road width to that calculated from L1 and L3

If straight line L3 was newly found near estimated straight line → Add L3 to detected straight lines If no straight line L3 is found near estimated straight line → Leave undetected Broken line Search should be able to jump over breaks Incompatible Situation is made even more difficult by shadow or the like Lane branching At break, search should also be able to ascertain connection with other direction Ideal curve recognition Actual curve recognition

FIG.51
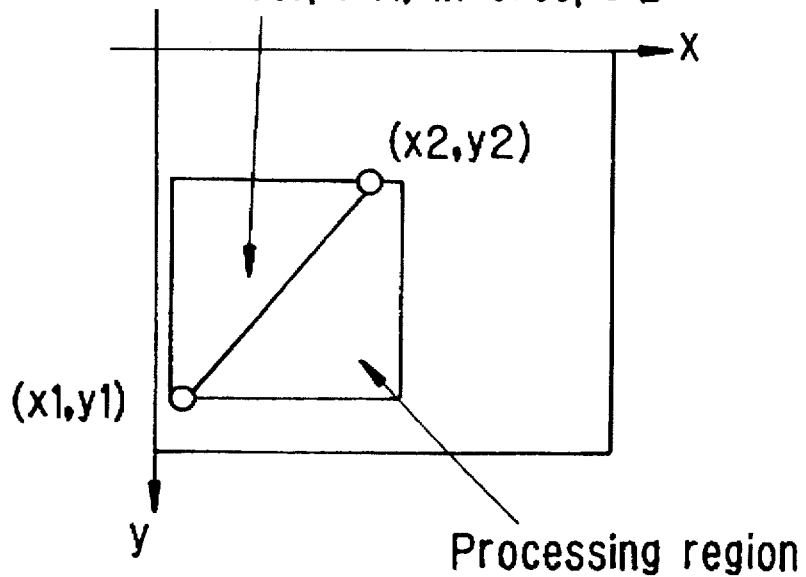
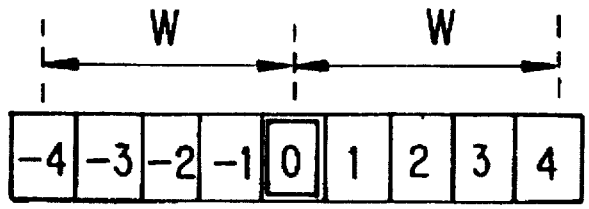
Position coefficients of scan data

FIG. 52
Flags indicating detection of edge point of intensity at or above threshold value
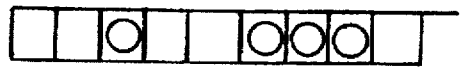
In the diagram above, the offset from center is
(−2 + 1 + 2 +3) / 4 = 1.0
so that the next scan is offset 1 to the right.
Candidate line segment
$y = A*x + A$
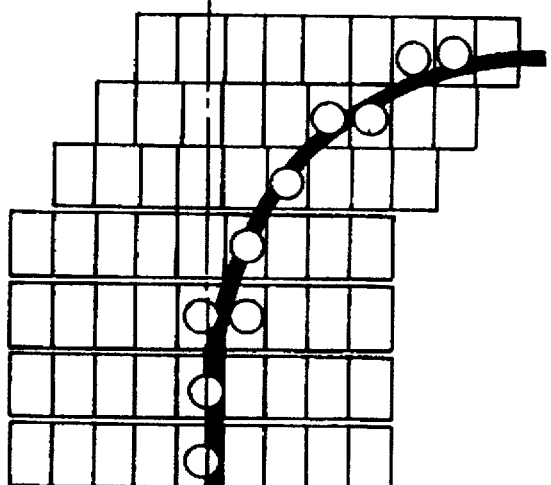
Edge image What was being recognized as a two-lane road became a three-lane road by addition of another lane on the right side Even though the lane pattern has changed, the new lane that has come into view cannot be detected, so that the vehicle cannot move to the lane on the right

LANE IMAGE PROCESSING SYSTEM FOR VEHICLE

BACKGROUND OF THE INVENTION

1. Field of the Invention

This invention relates to a system for processing lane images for a vehicle, more particularly to a system for processing lane images for a vehicle enabling a vehicle to accurately identify vehicle lanes while traveling on an expressway or in some other such environment including multiple vehicle lanes.

2. Description of the Prior Art

One existing technology relating to the processing of lane images for a vehicle is the method described in U.S. Pat. No. 4,970,653, for determining which regions of images received via a TV camera or the like require processing. As shown in FIG. 55, in this prior art the lane boundaries including lane boundary segments that have been lost sight of are actively determined based on lane boundary positions determined from an earlier image and the region of Hough space to be investigated is determined based on the lane boundaries determined in the preceding frame.

Japanese Laid-open Patent Application No. Sho 62-155140 also teaches a method in which lane boundary positions are estimated from the processing results of the preceding cycle, while Japanese Laid-open Patent Application No. Hei 1-161403 proposes a method for using vehicle movement information to estimate lane boundary positions in the currently input image from the positions according to the processing results in the preceding cycle.

The above and various other technologies so far proposed in connection with lane recognition and image processing are likely to err in lane recognition in actual traffic conditions when, for example, an obstacle such as a preceding vehicle comes into the camera field at a position overlapping a region to be processed, as shown in FIG. 56.

SUMMARY OF THE INVENTION

A first object of this invention is to overcome this problem by providing a system for processing lane images for a vehicle which enables stable and reliable vehicle self-navigation by setting the regions of the image to be processed such that the lane recognition is unaffected by the presence in the image of a preceding vehicle or other such obstacle and by selecting the optimum lane in a road environment in which obstacles such as other vehicles are present.

Further, Japanese Laid-open Patent Application No. Hei 4-36878 teaches a technique for detecting a vehicle lane (road). This prior art enables detection of the presence of a lane to the outside of a broken line insofar as the broken line can be recognized. Since perfect recognition of a broken line as such is not possible under all driving conditions, however, uncertainty remains at the time of the lane pattern changes (see FIG. 57).

A second object of the invention is therefore to provide a system for processing lane images capable for a vehicle of responding flexible to changes in the number of lanes even when the number thereof is unknown.

For realizing the foregoing objects, the present invention provides a system for processing lane images for a vehicle, including an image sensor mounted on the vehicle for viewing a roadway scene ahead of the vehicle to output image data of the roadway scene including a lane on which the vehicle travels, image data processing means for processing the image data to output lane information, and lane recognition means for recognizing the lane on which the vehicle travels based on the output lane information. The characteristic feature of the system is that obstacle position determining means is provided for determining position of an obstacle present in the roadway scene, processing region determining means is provided for determining a region of the data image to be processed at least based on the detected obstacle position such that the region excludes the detected obstacle position.

BRIEF DESCRIPTION OF THE DRAWINGS

The foregoing and other objects and advantages of the invention will be more apparent from the following description and drawings, in which:

FIG. 10 is a diagram for explaining the determination of start points and end points in the step in the subroutine of FIG. 7 for determining the start points and end points of approximative straight lines from estimated lane boundary data in the form of multipoint lines;

FIG. 15 is a diagram for explaining the subroutine according to the flowchart of FIG. 14;

FIG. 24 is a diagram comprised of FIGS. 24A and 24B for explaining why the middle portions of the processing regions set by the subroutine of FIG. 23 overlap;

FIG. 28 is a diagram comprising FIGS. 28A, 28B and 28C for explaining the subroutine according to the flowchart of FIG. 27;

FIG. 33 is a diagram comprising FIGS. 33A and 33B for explaining the subroutine according to FIG. 32;

FIG. 34 is a flowchart of a subroutine of the flowchart of FIG. 22 for setting processing forbidden regions when historical information and data on obstacles outside the vehicle's lane are available;

FIG. 35 is a diagram comprising FIGS. 35A and 35B for explaining the subroutine according to FIG. 34;

FIG. 36 is a diagram comprising FIGS. 36A, 36B and 36C for explaining the basis of the step in the main routine of FIG. 5 for specifying Hough transformation constraints using historical information;

FIG. 38 is a diagram comprising FIGS. 38A and 38B for explaining the subroutine according FIG. 37;

FIG. 39 is a diagram outlining the subroutine according FIG. 37;

FIG. 41 is a diagram comprising FIGS. 41A, 41B and 41C for explaining the step in the main routine of FIG. 5 for selecting representative lines from the Hough transformation results by clustering;

FIG. 44 is a diagram comprising FIGS. 44A and 44B for explaining the basis of the step in the main routine of FIG. 5 for checking for misdetection of the boundaries of the vehicle's lane using road width;

FIG. 45 is a diagram outlining the step in the main routine of FIG. 5 for using road width to check for misdetection of the boundaries of the vehicle's lane;

FIG. 51 is a diagram for explaining the subroutine according to FIG. 49;

FIG. 52 is also a diagram for explaining the subroutine according to FIG. 49;

DETAILED DESCRIPTION OF THE PREFERRED EMBODIMENTS

An embodiment of the invention will now be explained with reference to the attached drawings.

Figure 1:
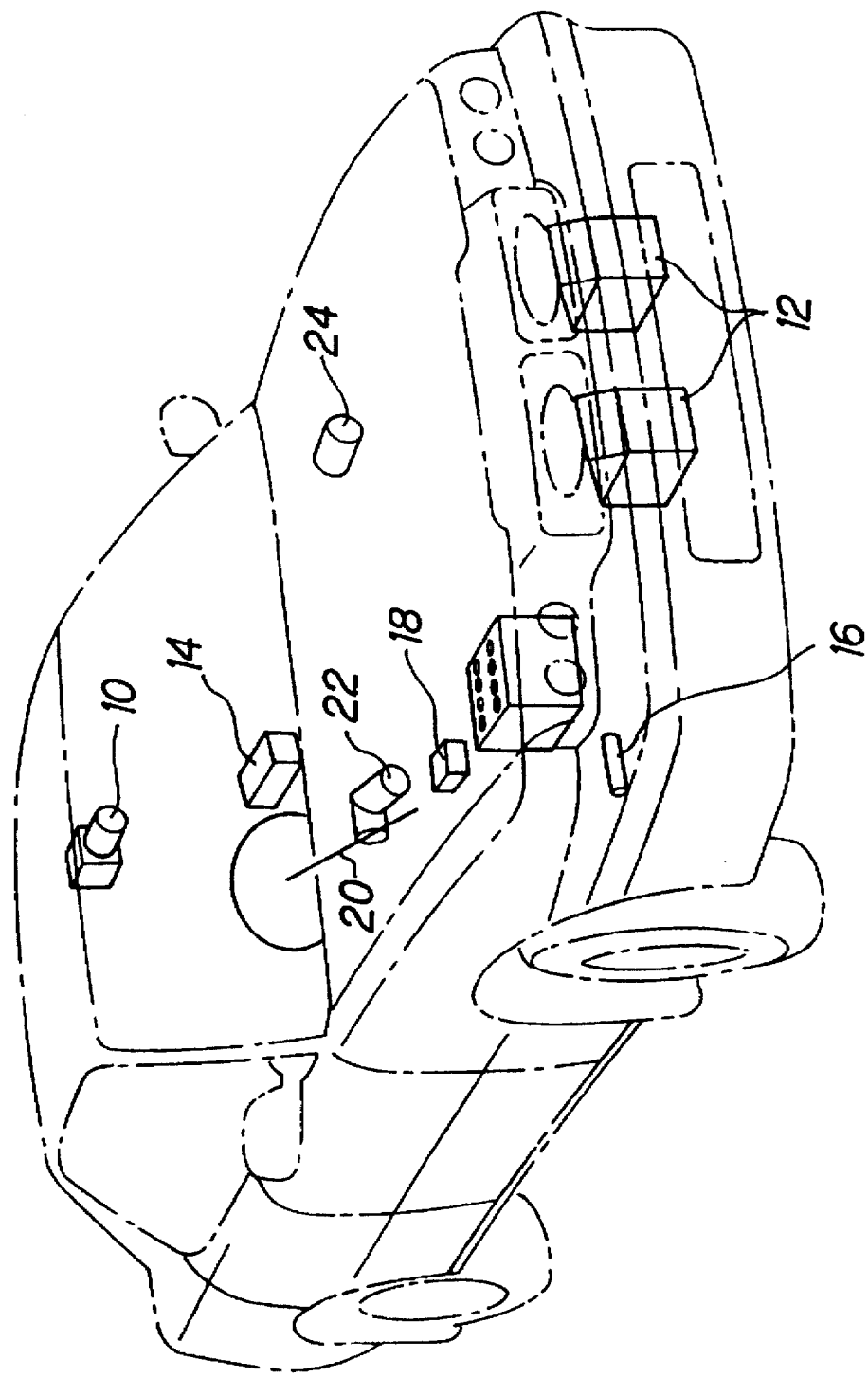
FIG. 1 is an overall perspective view for explaining a system for processing lane images for a vehicle according to the invention.

FIG. 1 shows an overall perspective view of the system for processing lane images for a vehicle according to the invention and loaded on a vehicle. As shown in this figure, the system is equipped with an image sensor such as a CCD (charge-coupled device) monochrome TV camera 10. The CCD camera (image sensor) 10 is mounted above the driver's seat in the vicinity of the rearview mirror to capture a monocular view of the road ahead. The system is further equipped with a radar system 12 comprising of 2 millimeter-wave radars mounted at the front of the vehicle to detects the presence of obstacles such as vehicles and other solid objects from the waves they reflect. A yaw rate sensor 14 is mounted near the center of the passenger compartment for detecting the angular acceleration of the vehicle around the gravitational axis (z-axis). In addition, a vehicle speed sensor 16 constituted as a reed switch is mounted in the vicinity of the vehicle drive shaft (not shown) for detecting the vehicle travel speed, and a steering angle sensor 18 is provided in the vicinity of the steering shaft 20 for detecting the steering angle.

The steering shaft 20 is equipped with a steering angle control motor 22, the throttle valve (not shown) is equipped with a throttle actuator 24 constituted as a stepping motor, and the brake system (not shown) is equipped with a brake pressure actuator 26 (not shown in FIG. 1). With this configuration, the vehicle navigates automatically by controlling the steering angle in accordance with a calculated steering angle control amount, adjusting the vehicle speed by controlling the throttle valve opening, and, when necessary, applying the brakes.

Figure 2:
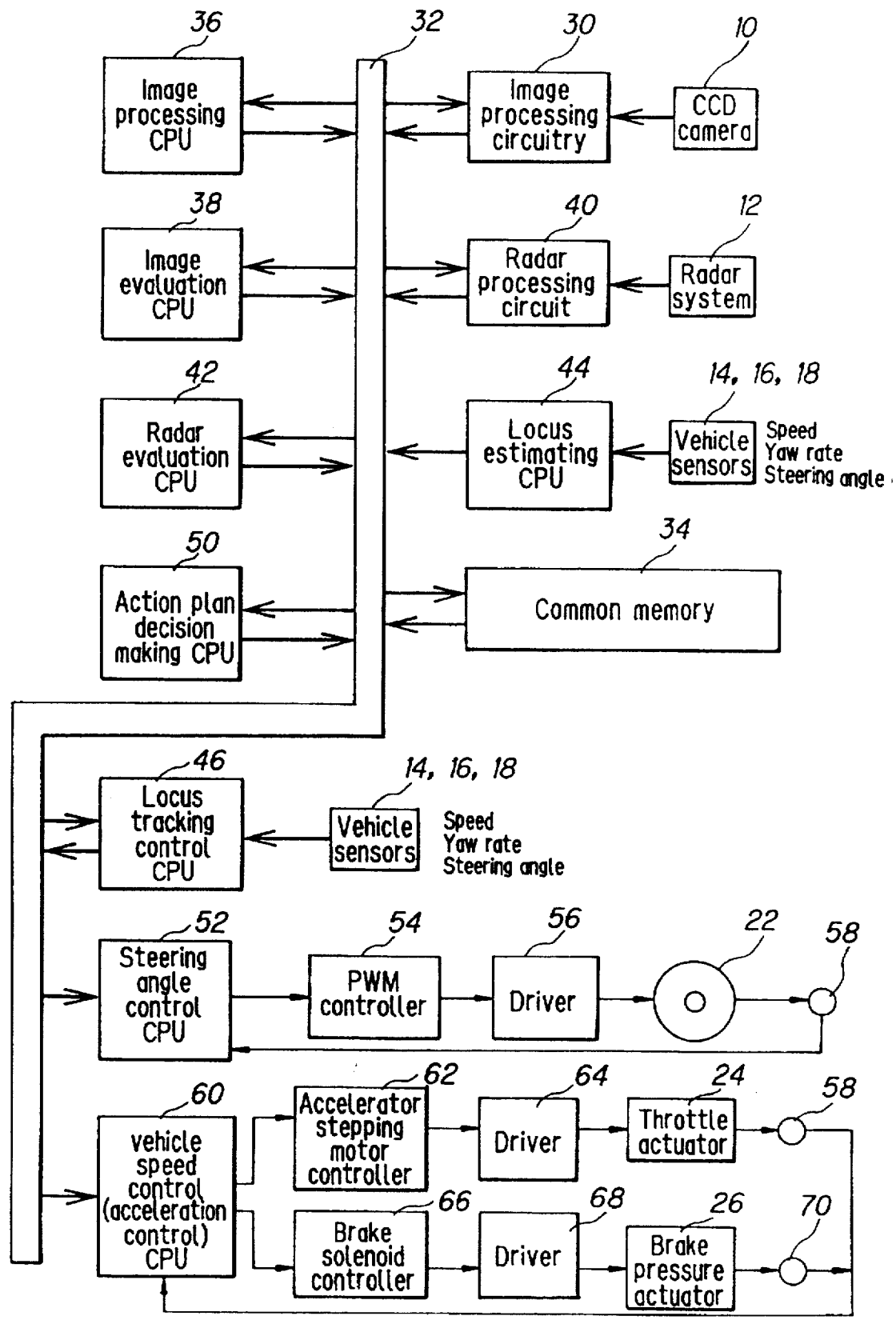
FIG. 2 is a block diagram showing particulars regarding the sensors of FIG. 1 and the processing of the sensor outputs.

The aforesaid configuration is shown in detail in the block diagram of FIG. 2. The output of the CCD camera 10 is sent to image processing circuitry or hardware 30 where straight line segments are extracted by edge detection and Hough transformation, and the result is forwarded through a bus 32 for storage in a common memory 34. An image processing CPU 36 extracts lane boundary candidates from among the straight line segments and stores them in the common memory 34. An image evaluation CPU 38 reads the stored values at prescribed times and uses them to determine the lane boundaries. The output of the radar system 12 is sent through a radar processing circuit 40 and the bus 32 to be stored in the common memory 34. A radar evaluation CPU 42 reads the stored values at prescribed times for detecting the positions of obstacles within a coordinate system.

The outputs from the vehicle speed sensor 16 etc. are sent to a locus estimating CPU 44 for estimating the vehicle locus. An action plan decision making CPU 50 produces a desired course based on the stored values. The desired course and the estimated vehicle locus are sent to a locus tracking control CPU 46 which decides a locus (desired course) tracking control amount. In addition, the locus tracking control CPU 46 calculates the steering angle control amount and forwards it to a steering angle control CPU 52 which drives the steering angle control motor 22 through a PWM (pulse width modulation) controller 54 and a driver 56. The amount by which the motor is driven is detected by an encoder 58 and used for feedback control.

A speed/tracking control section of the action plan decision making CPU 50 calculates a desired vehicle body acceleration and forwards it to a vehicle speed control CPU 60. The vehicle speed control CPU 60 drives the throttle actuator 24 through an accelerator stepping motor controller 62 and a driver 64 and drives the brake pressure actuator 26 through a brake solenoid controller 66 and a driver 68. The amount by which the brake pressure actuator 26 is driven is detected by a pressure sensor 70 and used for secondary feedback control.

Figure 3:
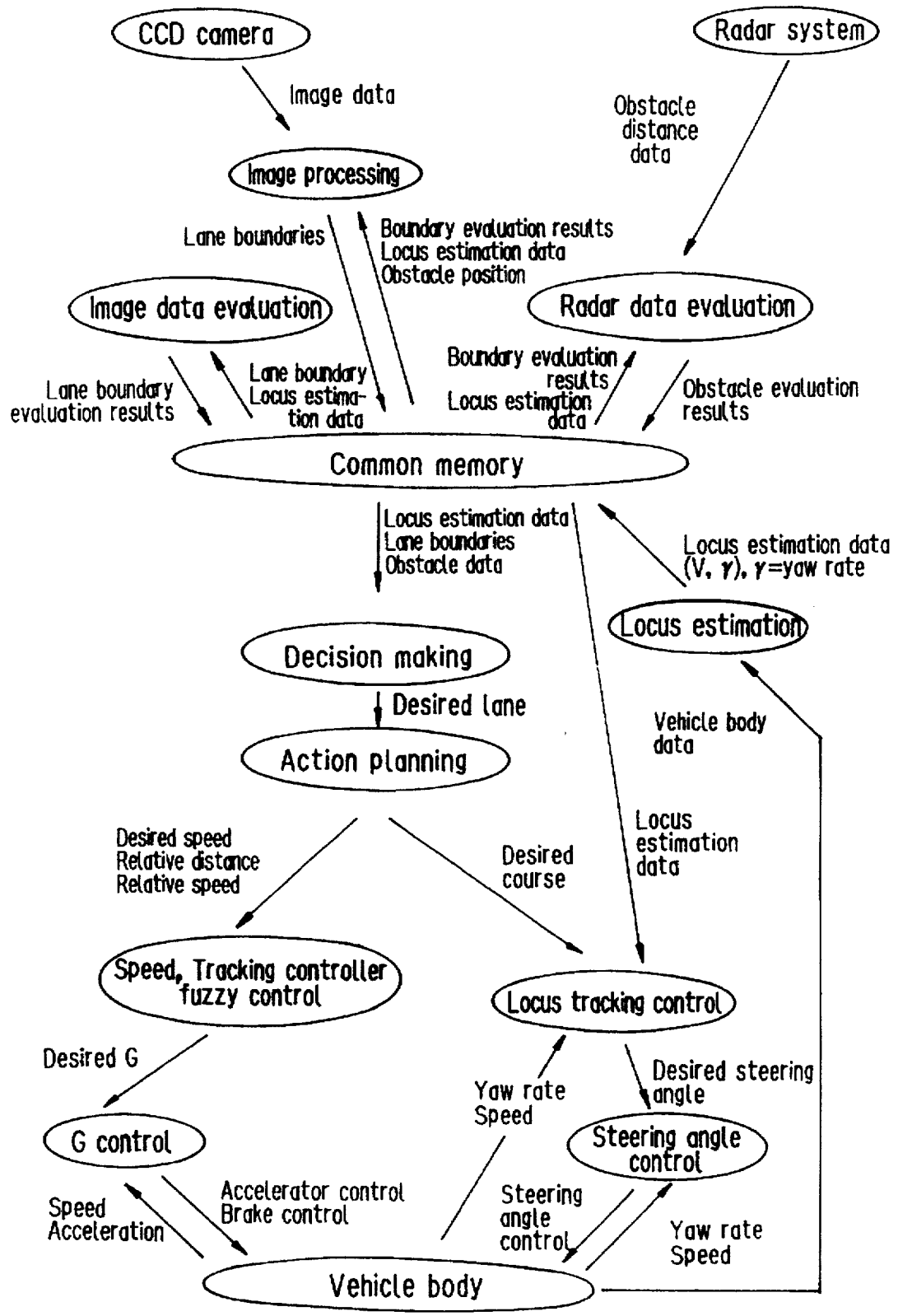
FIG. 3 is a block diagram similar to that of FIG. 2 for explaining the configuration of FIG. 2 more in terms of function.
Figure 4:
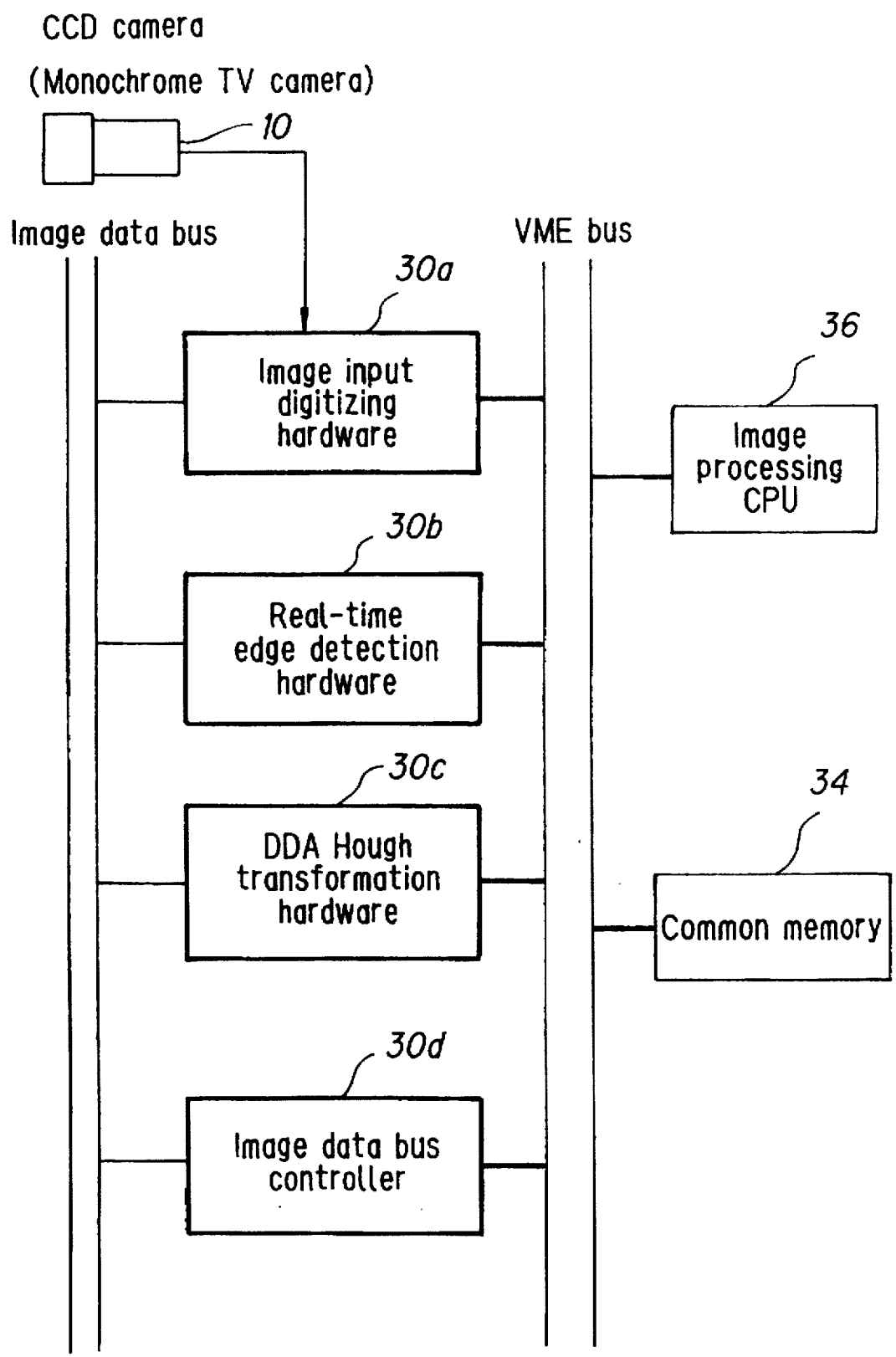
FIG. 4 is a block diagram showing the image processing hardware of the block diagram of FIG. 2 (particulars of the system for processing lane images for a vehicle)

Although omitted from the drawings in the interest of simplicity, the configuration also includes waveform shaping circuits and other sensor output processing circuits. FIG. 3 shows the functions of the block diagram of FIG. 2. FIG. 4 is a block diagram showing the image processing circuitry or hardware of the block diagram of FIG. 2 (the particulars of the system for processing vehicle lane images according to the invention). The image processing circuitry or hardware 30 of FIG. 4 specifically includes image input digitizing hardware 30a, real-time edge detection hardware 30b, Hough transformation hardware 30c and an image data bus controller 30d.

The operation of the system for processing lane images for a vehicle will now be explained with reference to the flowchart of FIG. 5.

First, estimated vehicle movement data are read in S10.

Figure 6:
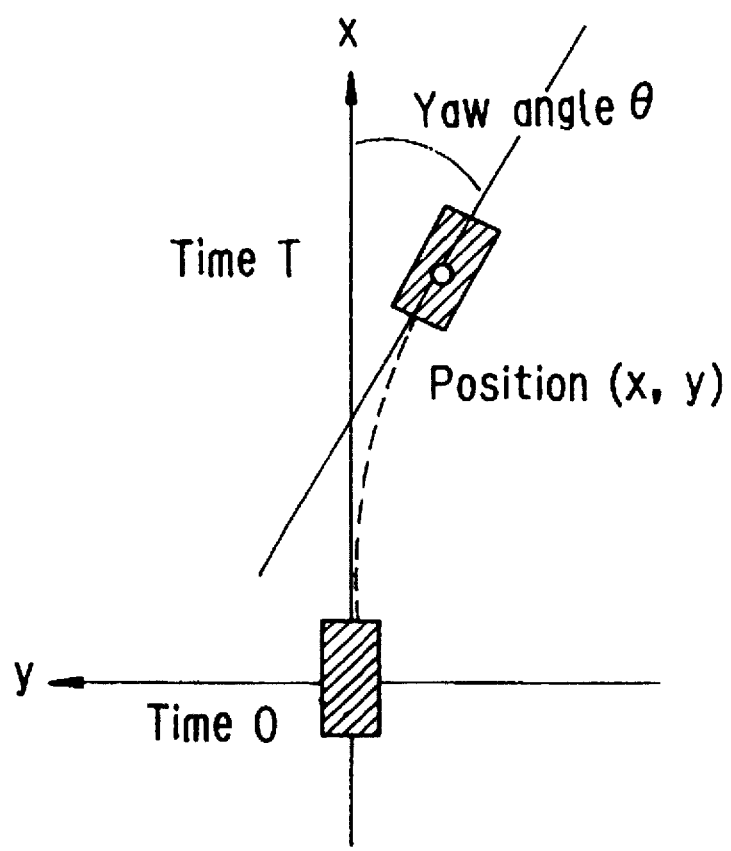
FIG. 6 is an diagram for explaining the step in the main routine of FIG. 5 for reading estimated vehicle movement data.

As shown in FIG. 6, this is done by, for example, defining the system startup time as time 0 and estimating the movement of the vehicle in an absolute coordinate system whose origin is the position of the vehicle at this time. The vehicle's position (x, y) and its yaw angle θ relative to the axis of the coordinate system at time T are calculated by a locus estimating section (the locus estimating CPU 44 in FIG. 2) using the speed and yaw rate detected by the vehicle sensors. Prior to image input, the image processing CPU 36 receives these data and converts them to information regarding the vehicle position and yaw angle at the time of image input.

Next, in S12, a camera pitch angle correction value is calculated from the amount of vehicle pitch angle variation.

This is for use in correcting the position and elevation of the CCD camera 10, which change owing to change in the attitude (pitch angle) of the vehicle during acceleration or deceleration. Specifically, this is achieved by mounting height sensors at the four corners of the vehicle (these sensors are omitted from FIGS. 1 and 2), determining the positional relationship between the vehicle and the road surface, and using the information obtained to correct the camera elevation, thereby preventing errors in mapping calculations between coordinates in the image and coordinates in the actual plane coordinates.

In the following S14, the lane boundary positions estimated by the image evaluation CPU 38 up to the preceding processing cycle are read and the lane boundaries on the vehicle sides are stored as historical information. This information is an important factor in the setting of the processing region of the image input in the current cycle and the constraints on the straight lines detected by Hough transformation.

Figure 7:
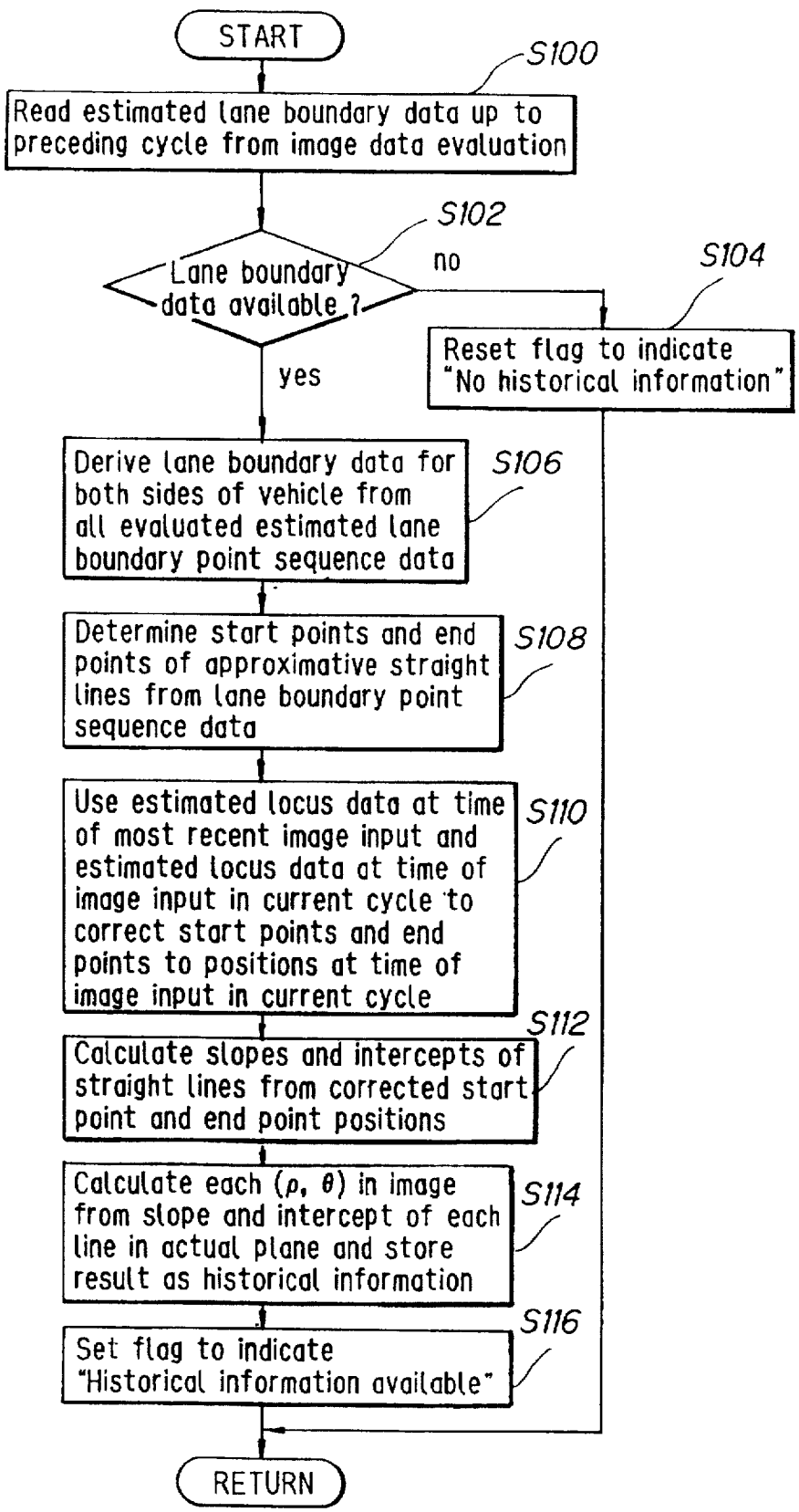
FIG. 7 is a flowchart of a subroutine of the main routine of FIG. 5 for reading lane boundary positions and storing the lane boundaries on the vehicle side as historical information.
Figure 8:
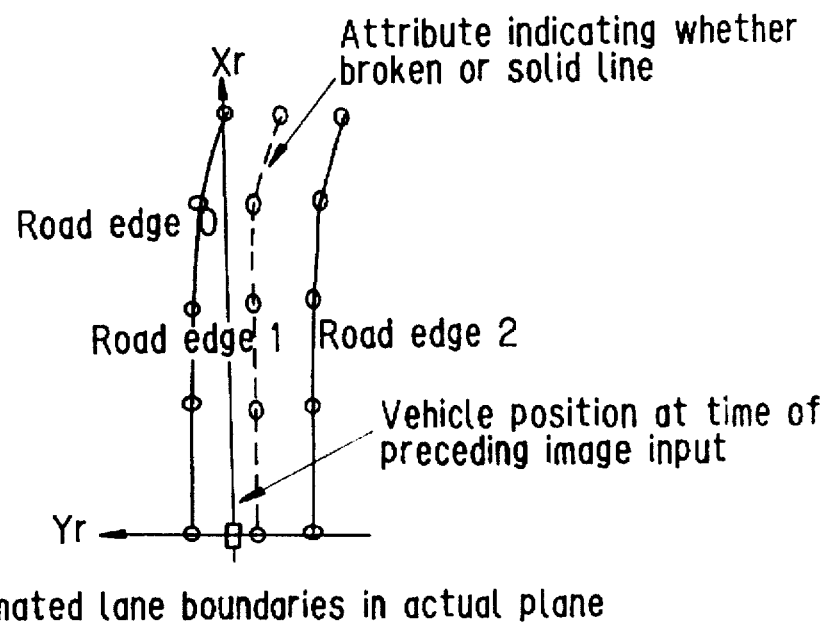
FIG. 8 is a diagram for explaining the estimated lane boundaries in the "actual plane" referred to in the subroutine of FIG. 7.

This will be explained with reference to the flowchart of FIG. 7. First, in S100 of this subroutine, the estimated lane boundary data up to the preceding cycle are read from the image data estimation. In other words, the estimated lane boundaries in the actual plane of an image data evaluation such as shown in FIG. 8 are read.

Figure 9:
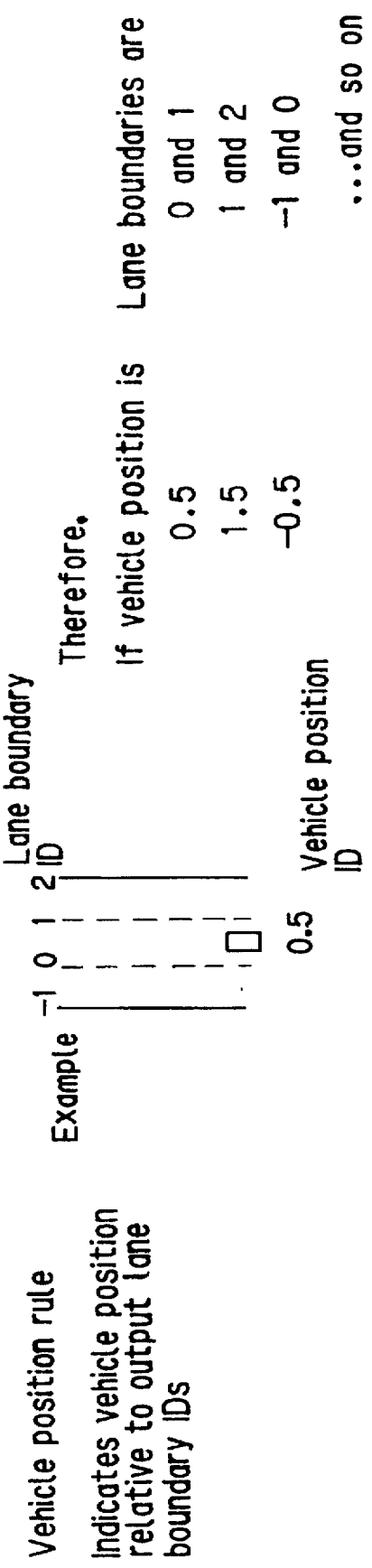
FIG. 9 is a diagram for explaining the rule for determining the vehicle position in the subroutine of FIG. 7.

Next, in S102, a check is made as to whether lane boundary data are available. Since the result of this discrimination is naturally NO at system startup, the program advances to S104 in which a flag is reset to 0 to indicate "No historical information". On the other hand, if the result of the discrimination in the S102 is YES, the program advances to S106 in which lane boundary data for both sides of the vehicle are derived from all evaluated estimated lane boundary point sequence data. The estimated lane boundary data evaluated by image data evaluation and the vehicle position are assigned IDs from the left side in accordance with the rule set out in FIG. 9.

Figure 11:
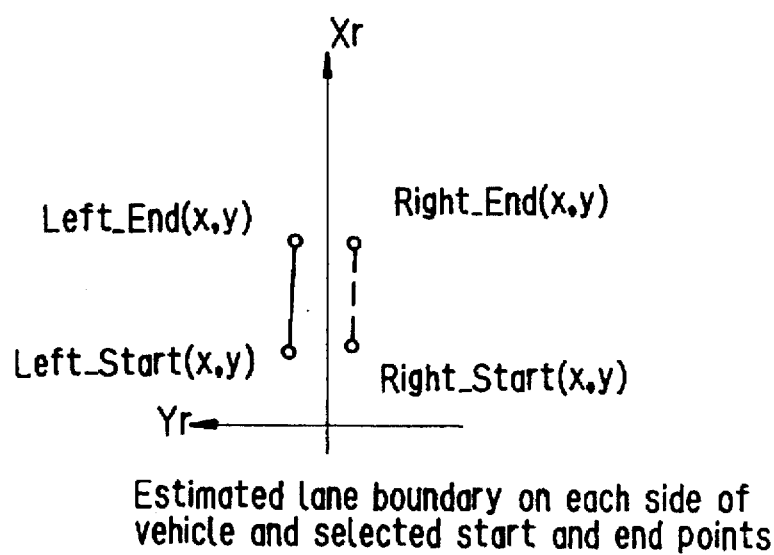
FIG. 11 is a diagram for explaining the estimated lane boundaries on the vehicle side and the selected start and end points.

Next, in S108, the start points and end points of approximative straight lines are determined from the lane boundary point sequence data. As shown in FIG. 10, this is conducted by selecting the second point of each set of estimated lane boundary point sequence data as the start point and the third point thereof as the end point. FIG. 11 shows the estimated lane boundary on each side of the vehicle and the selected start and end points.

Figure 12:
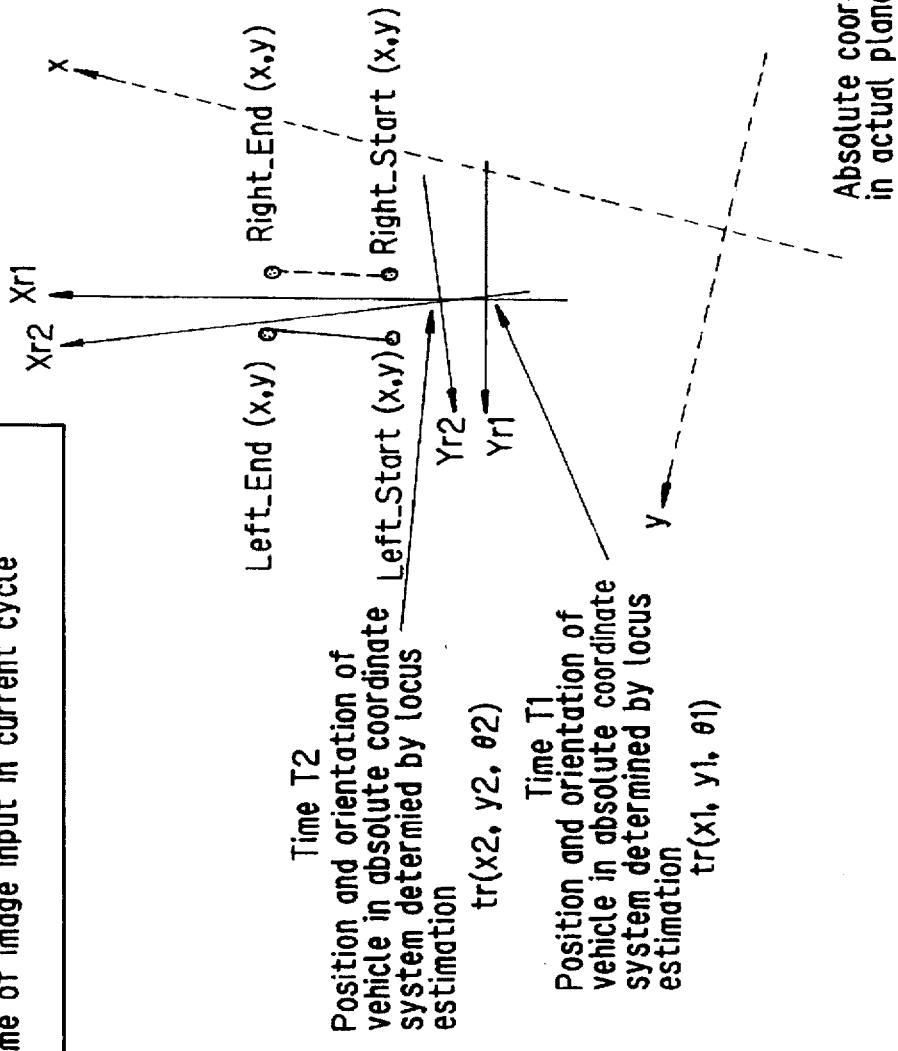
FIG. 12 is a diagram for explaining the step in the subroutine of FIG. 7 for using estimated locus data at the time of most recent image input and the estimated locus data at the time of image input in the current cycle to correct the start points and end points to the positions at the time of image input in the current cycle.

In the following S110, the estimated locus data at the time of most recent image input and the estimated locus data at the time of image input in the current cycle are used to correct the start points and end points to the positions at the time of image input in the current cycle. As shown in FIG. 12, the image data evaluation is conducted by converting the four points Left-Start, Left-End, Right-Start and Right-End in the relative coordinate system (Xr1, Yr1) whose origin is the position of the vehicle at the input time T1 of the image which is the most recent image processing result used in the evaluation to points in the relative coordinate system (Xr2, Yr2) at the input time T2 of the image to be processed in the current cycle.

Figure 13:
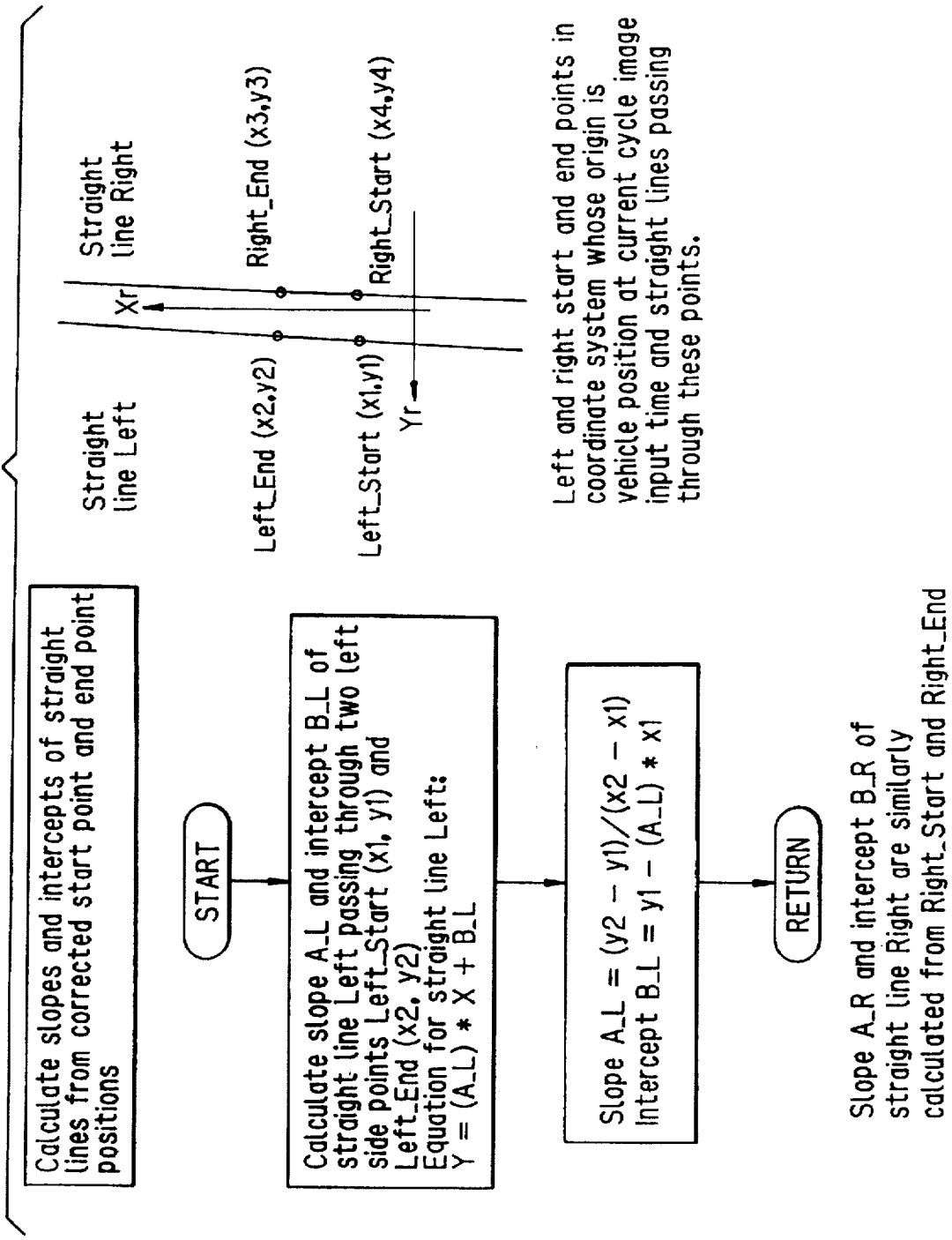
FIG. 13 is diagram for explaining the step in the subroutine of FIG. 7 for calculating the slopes and intercepts of the straight lines from the corrected start point and end point positions.
Figure 14:
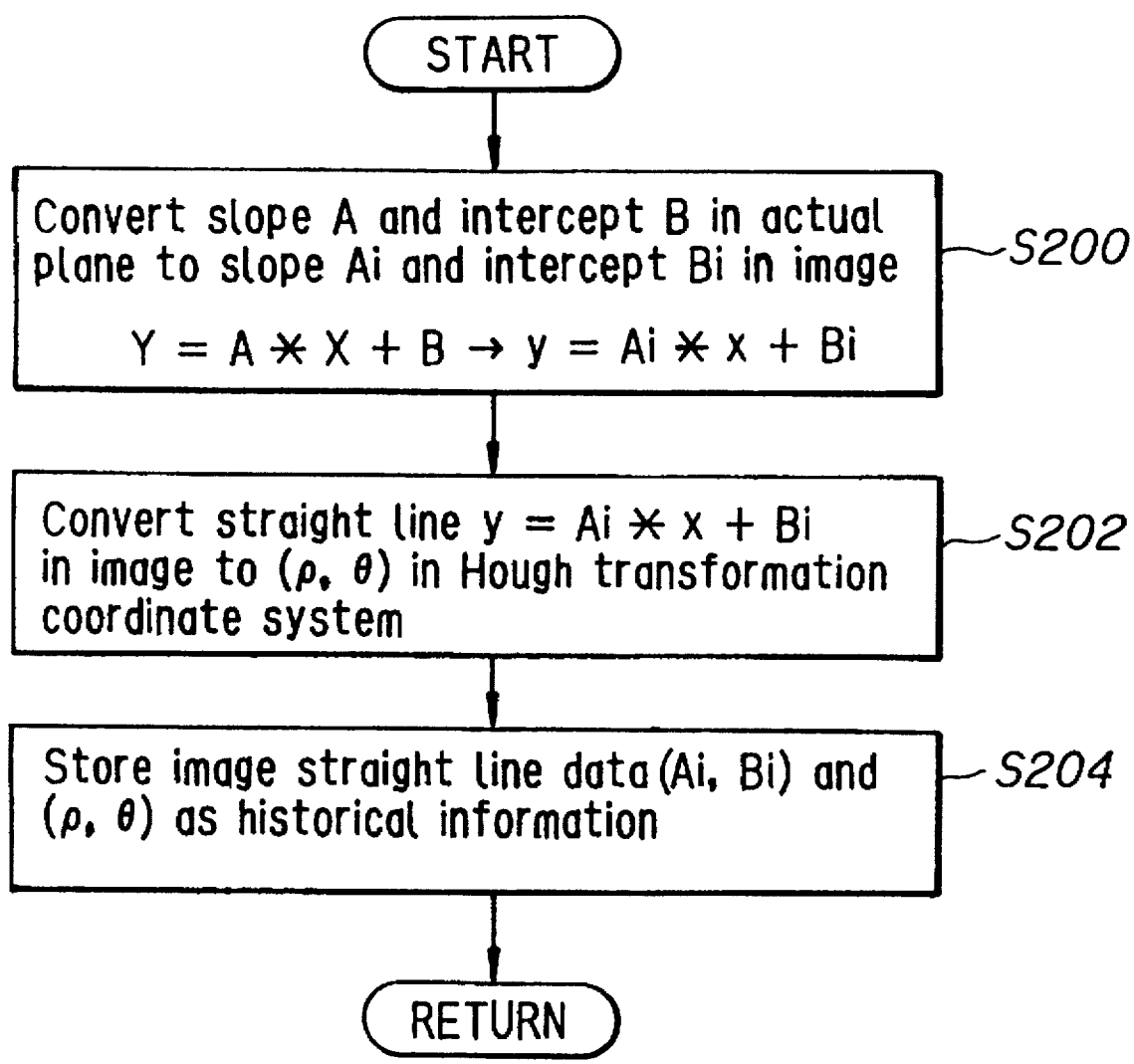
FIG. 14 is a flowchart of a subroutine of the subroutine of FIG. 7 for calculating each (p, θ) in the image from the slope of each line in the actual plane and storing the result as historical information.

In the next S112, the slopes and intercepts of the straight lines are calculated from the corrected start point and end point positions. This operation is explained in FIG. 13. In the following S114, each (rho, θ) in the image is calculated from the slope and intercept of each line in the actual plane and the result is stored as historical information. This calculation is conducted by steps S200 to S204 of FIG. 14.

To be specific, the left and right straight lines

Left (slope A_L, intercept B_L)

Right (slope A_R, intercept B_R)

in the actual plane coordinate system having the vehicle position at the time of current cycle image input as its origin are converted to the lines in the image, the (rho, θ) values in the Hough transformation coordinate system, namely Left' (rho_L, θ_L)

Right' (rho_R, θ_R)

are calculated, and the results are stored as "historical information." (As shown in FIG. 15, in this embodiment the origin of the Hough transformation coordinate system in the image is defined as the center of the lower edge of the image, the length of a line drawn perpendicular to line L from the origin is defined as rho, and the angle thereof measured counterclockwise from the lower edge of the image is defined as θ)

Figure 16:
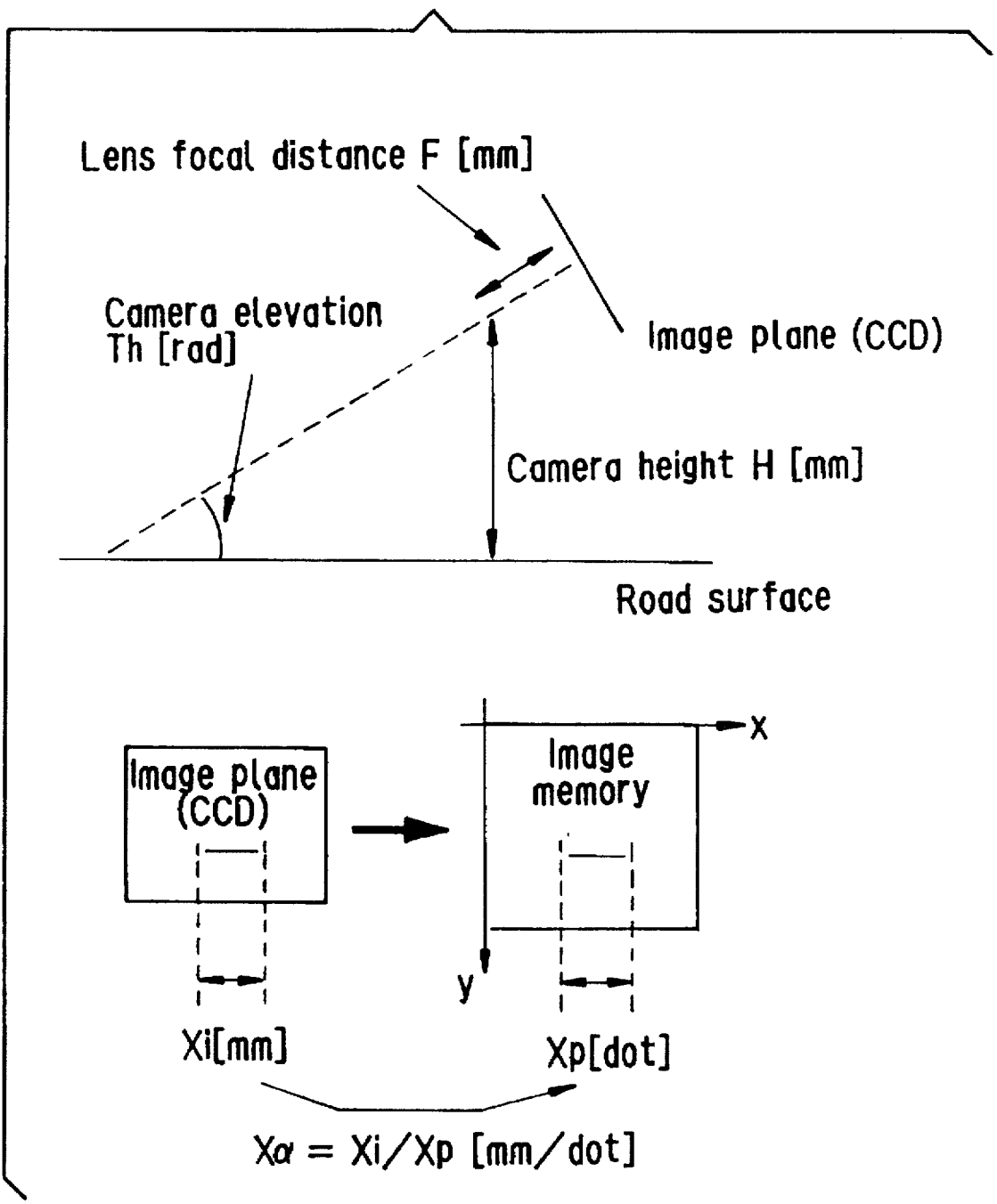
FIG. 16 is a diagram for explaining camera parameters used in the subroutine according to the flowchart of FIG. 14.

Camera parameters such as shown in FIG. 16 are used in converting positions in the actual plane to positions in the image. In this embodiment, camera height H =1150 (mm), camera elevation Th=0.043 (rad) and lens focal distance F=12 (mm). In addition, the imaging element is a ½-inch CCD (512×512 dot), and Xα is set to 0.0115 (mm/dot) and Yα to 0.0095 (mm/dot), where Xα and Yα are parameters indicating the length which a single dot in memory assumes in the image plane of the CCD camera 10. The program then advances to S116 in the subroutine of FIG. 7, wherein a flag is set to 1 to indicate "Historical information available".

Figure 5:
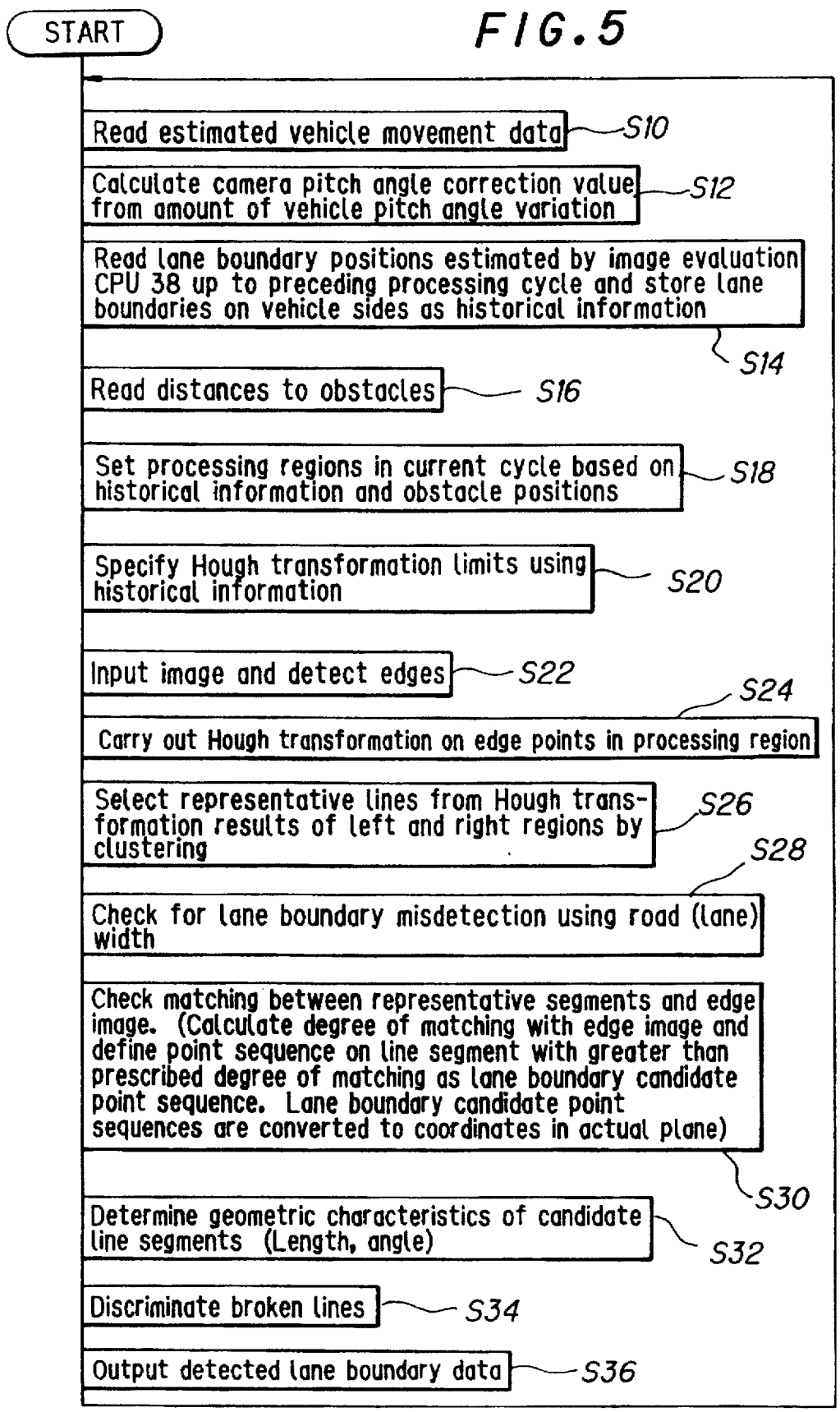
FIG. 5 is a main flowchart showing the operations of the system for processing lane images for a vehicle according to the invention.

Returning to main routine of FIG. 5, the distances to obstacles are read in S16. The term "obstacle" here refers mainly to the preceding vehicle but also includes fixed objects.

Figure 17:
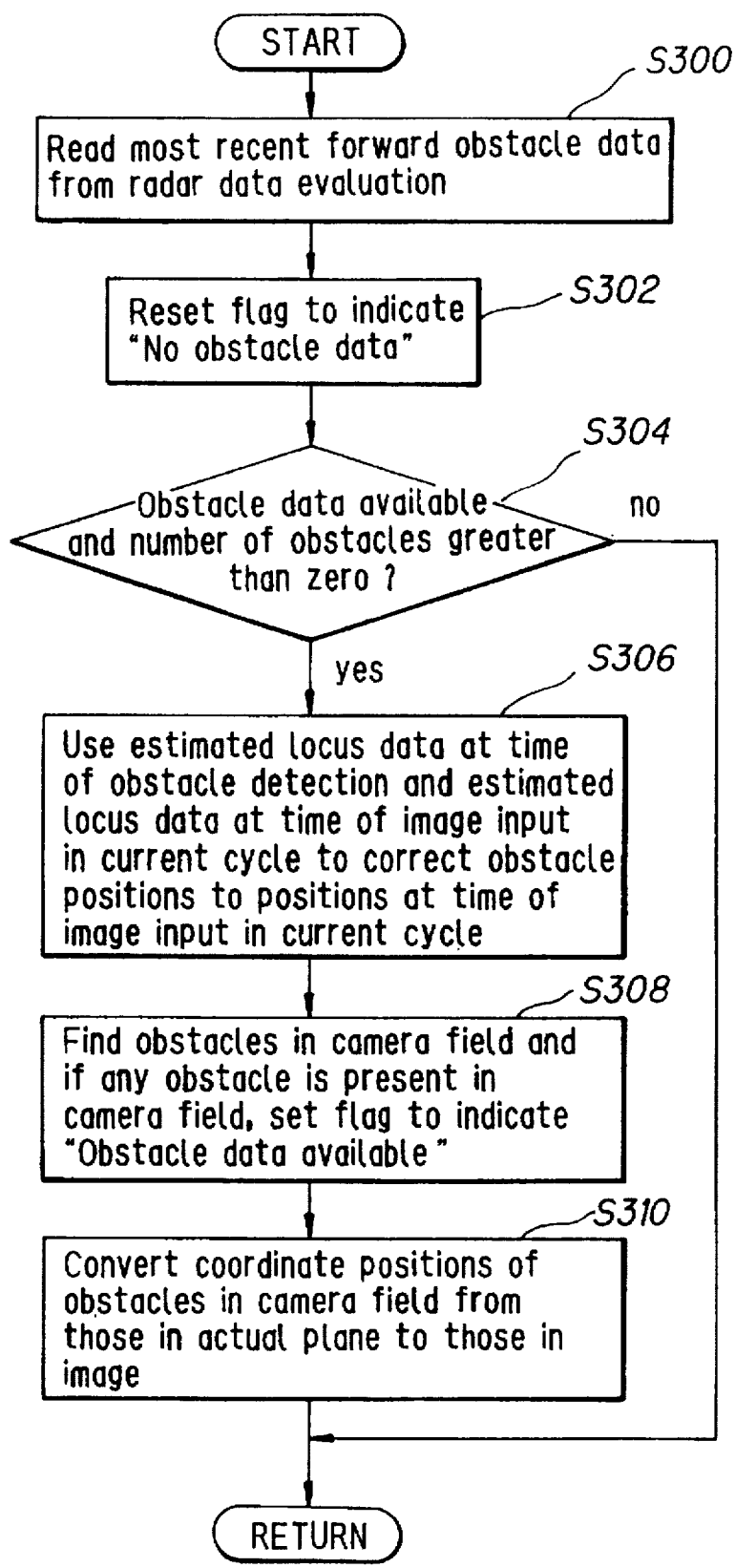
FIG. 17 is a flowchart of a subroutine of the main routine of FIG. 5 for reading distance to an obstacle.

The subroutine for this is shown by the flowchart of FIG. 17. First, in S300, the most recent forward obstacle data are read from the radar data evaluation (radar evaluation CPU 42 in FIG. 2). Next, in S302, a flag is initially reset to 0 to indicate "No obstacle data", whereafter a check is made in S304 as to whether or not obstacle data are available and the number of obstacles is greater than zero.

Figure 18:
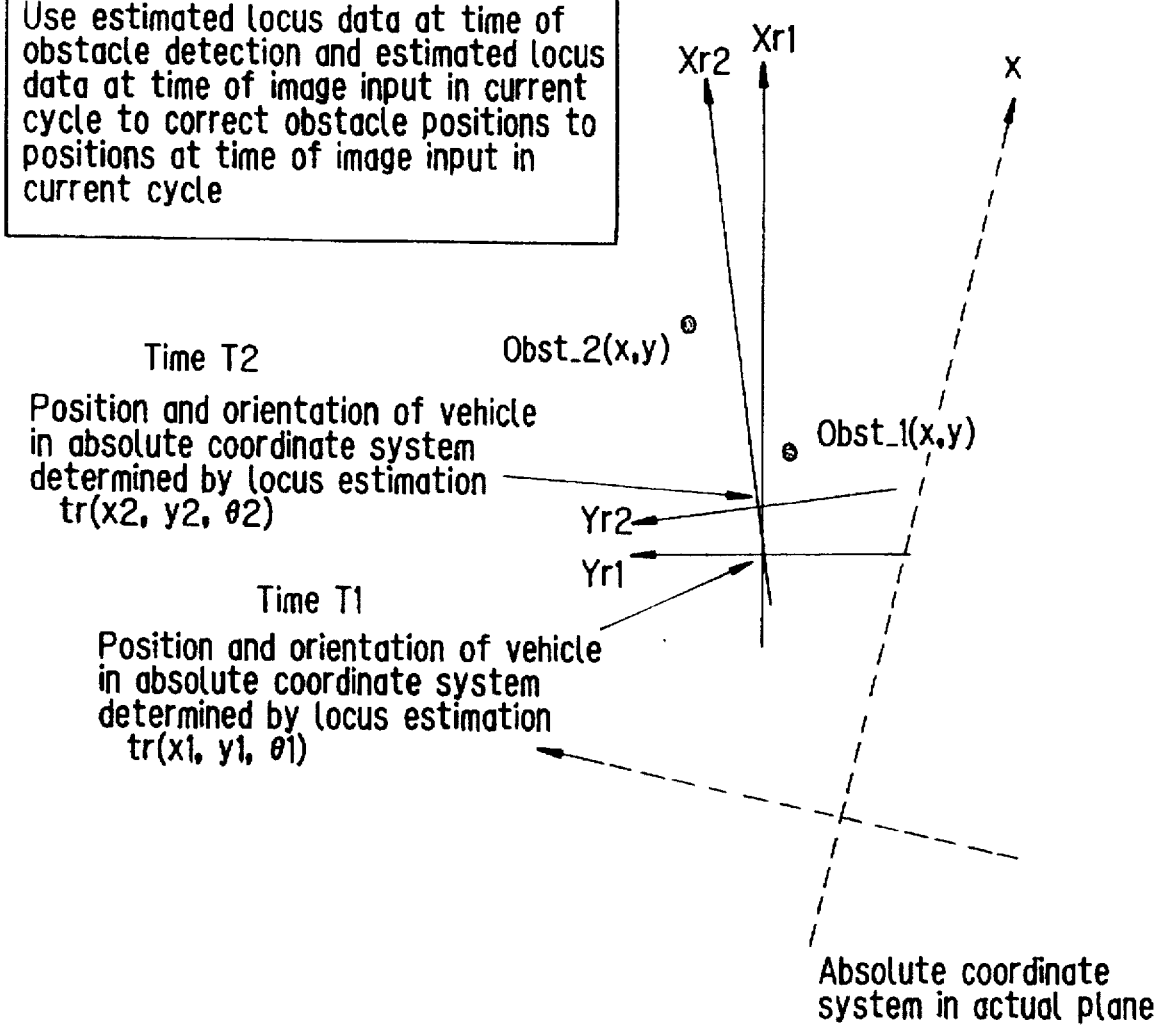
FIG. 18 is a diagram for explaining the step in the subroutine of FIG. 17 for using estimated locus data at the time of obstacle detection and estimated locus data at the time of image input in the current cycle to correct obstacle positions to positions at the time of image input in the current cycle.

If the result in S304 is YES, the program moves to S306, in which estimated locus data at the time of obstacle detection and estimated locus data at the time of image input in the current cycle are used to correct obstacle positions to positions at the time of image input in the current cycle. This operation is explained in FIG. 18. As shown in this figure, this is conducted by converting the position in the relative coordinate system (Xr1, Yr1) whose origin is the position of the vehicle at the input time T1 of the image which is the most recent image processing result used in the evaluation to points in the relative coordinate system (Xr2, Yr2) at the input time T2 of the image to be processed in the current cycle.

Figure 19:
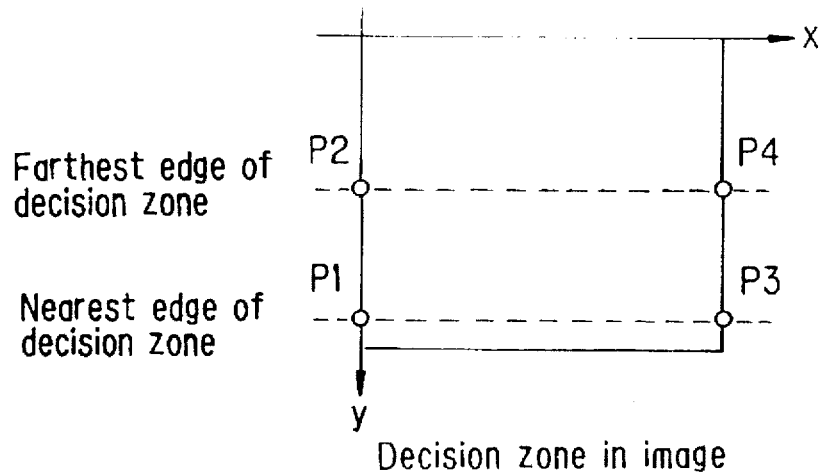
FIG. 19 is a diagram for explaining an image inspection zone used in the step of the subroutine of FIG. 17 for determining the presence of obstacles in the camera field.
Figure 20:
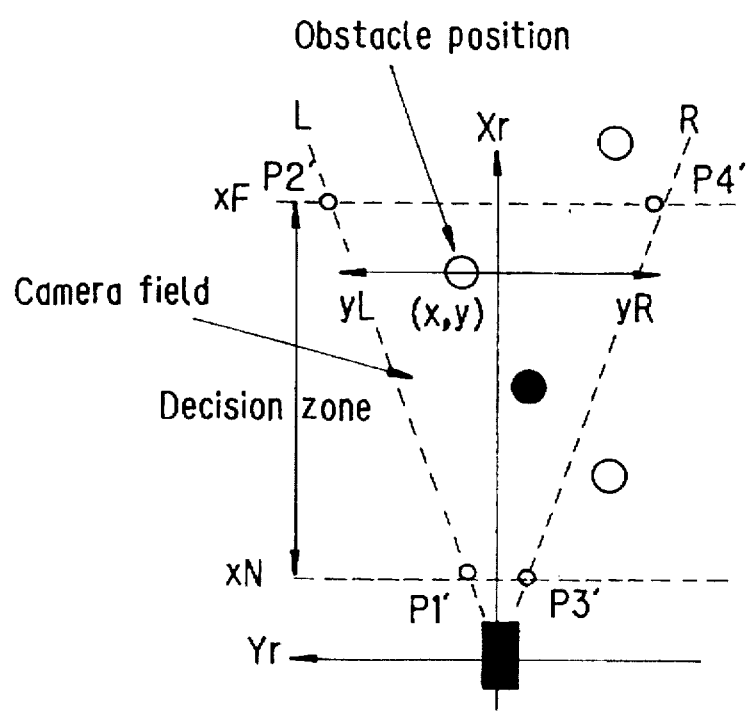
FIG. 20 is a diagram for explaining similar determination in the camera field in the actual plane.

Next, in S308, obstacles in the camera field are found and if any obstacle is present in the camera field, a flag is set to 1 to indicate "Obstacle data available". As shown in FIGS. 19 and 20, the procedure for finding obstacles in the camera field involves using an equation for converting the four points P1, P2, P3 and P4 at the left and right extremities of the near and far edges of an inspection zone of the image shown in FIG. 19 from the image plane to the actual plane and calculating the equations y=AL·x+BL and y=AR·x+BR of the straight field boundary lines L and R passing through the pairs of points on the left and right, as shown in FIG. 20.

In this embodiment, the inspection zone is set to have a length extending from 5 m to 80 m forward of the vehicle (xN=5 (m), xF=80 (m)). The obstacle positions (x, y) are substituted into the L and R equations and the obstacle is judged to be within the camera field if y is between the so-obtained yL and yR and also within the length of the inspection zone.

Figure 21:
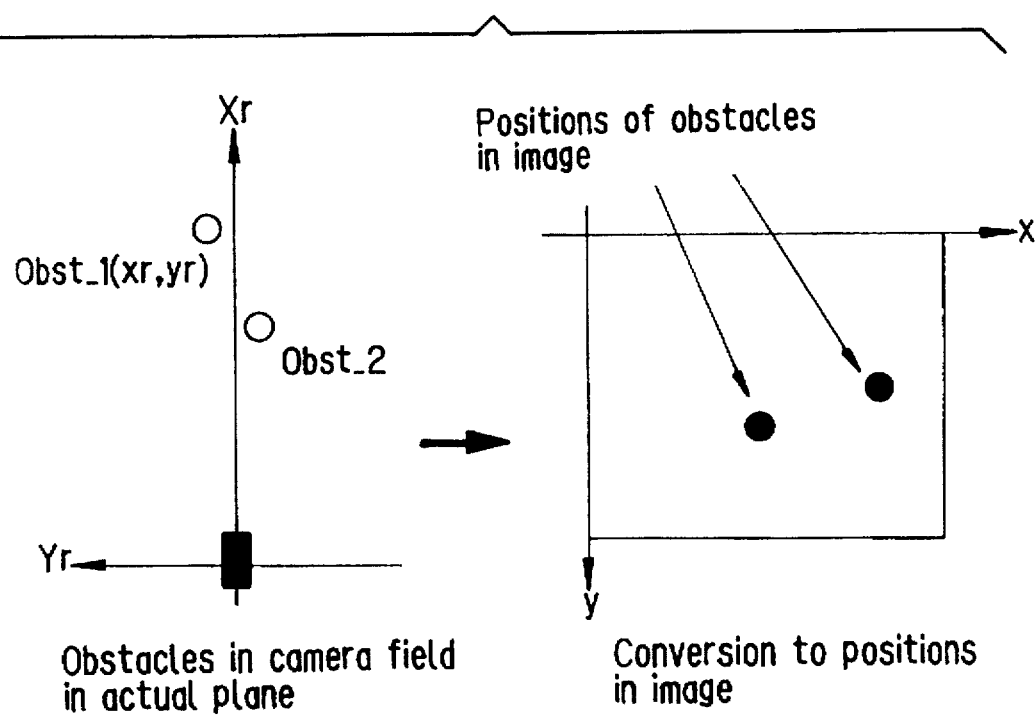
FIG. 21 is a diagram for explaining the step in the subroutine of FIG. 17 for converting the positions of obstacles in the camera field from coordinates in the actual plane to coordinates in the image.

Next, in S310, the corrected positions of obstacles in the camera field are converted from coordinates in the actual plane to coordinates in the image. This operation is explained in FIG. 21. The camera parameters mentioned earlier are used in this conversion. (If the result in S304 is NO, the program immediately returns to the main routine of FIG. 5.)

Next, in S18 of the main routine of FIG. 5, the processing regions in the current cycle are set on the image based on the historical information and obstacle positions.

Figure 23:
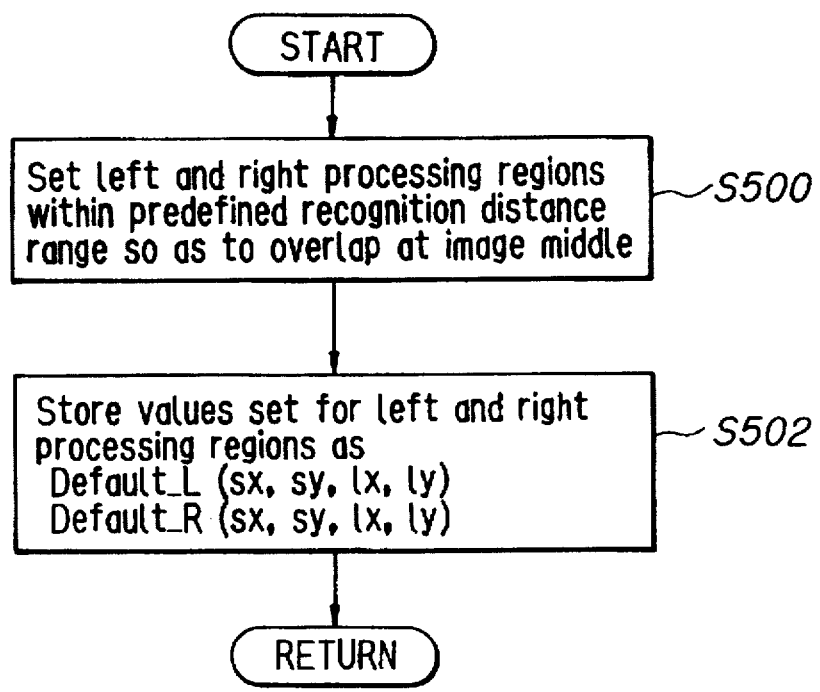
FIG. 23 is a flowchart of a subroutine of the subroutine of FIG. 22 for setting the processing regions when no historical information is available.
Figure 22:
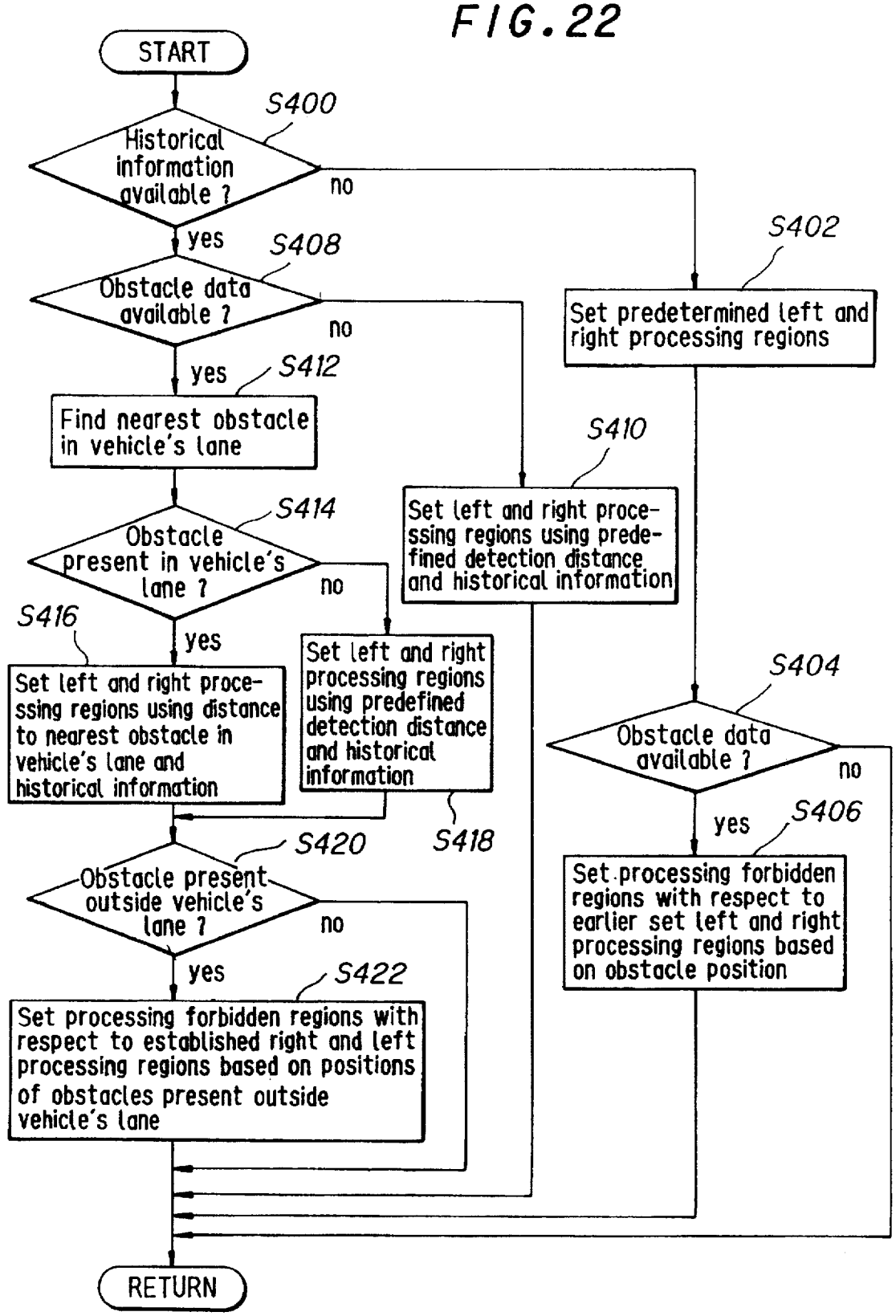
FIG. 22 is a flowchart of a subroutine of the main routine of FIG. 5 for setting the processing regions in the current cycle based on historical information and obstacle positions.

The subroutine for this is shown by the flowchart of FIG. 22. First, a check is made in S400 as to whether or not historical information is available. If the result in S400 is NO, predefined left and right processing regions are set in S402. This operation is conducted according to S500 and S502 of the flowchart of FIG. 23.

Figure 25:
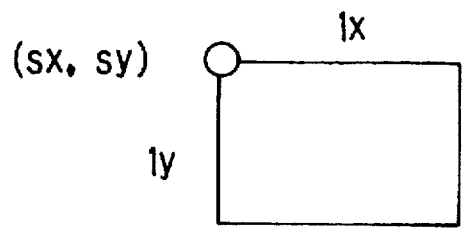
FIG. 25 is a diagram for explaining the positions of the processing regions set by the subroutine of FIG. 23.

In the flowchart, first, as shown in FIG. 24, left and right processing regions that overlap in the middle are set in S500. The overlapping of the regions in the middle is for enabling obstacle detection even when the vehicle straddles a lane boundary. Next, in S502, the set values are stored as the processing regions (Default-L, R). As shown in FIG. 25, each of the left and right processing regions is represented to have a start point (sx, sy) at the upper left and to extend lateral and vertical distances (lx, ly) from the start point.

Figure 26:
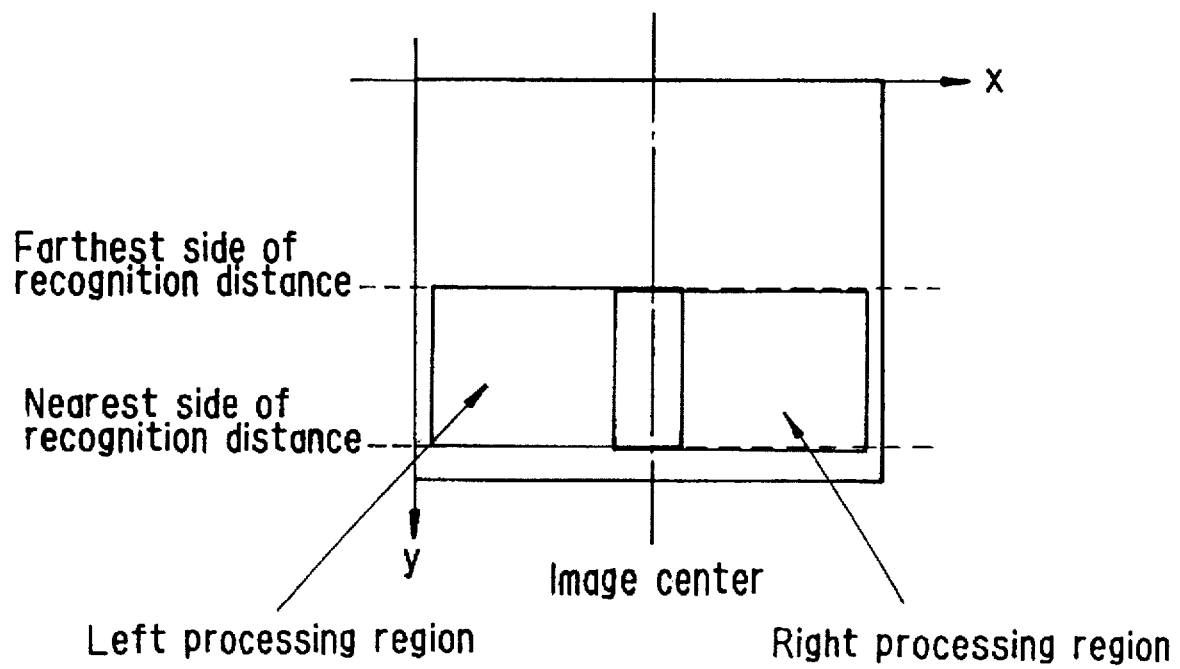
FIG. 26 is a diagram for explaining processing regions set by the subroutine of FIG. 23.

FIG. 26 shows the processing regions set in the foregoing manner. In this embodiment, the nearest side of the recognition distance is set at 5 m and the farthest side at 80 m. The positions of the nearest and farthest sides in the image is calculated using an equation for converting from actual plane positions to image positions. In this embodiment, 16-dot overlaps are provided to the left and right of the image center line. This is to accommodate vehicle tilt relative to the lane boundary during ordinary lane change while driving on an expressway. Further, for avoiding the effect of edge detection processing and other such filtering, 8-dot margins are provided at the left and right edges of the image.

Figure 27:
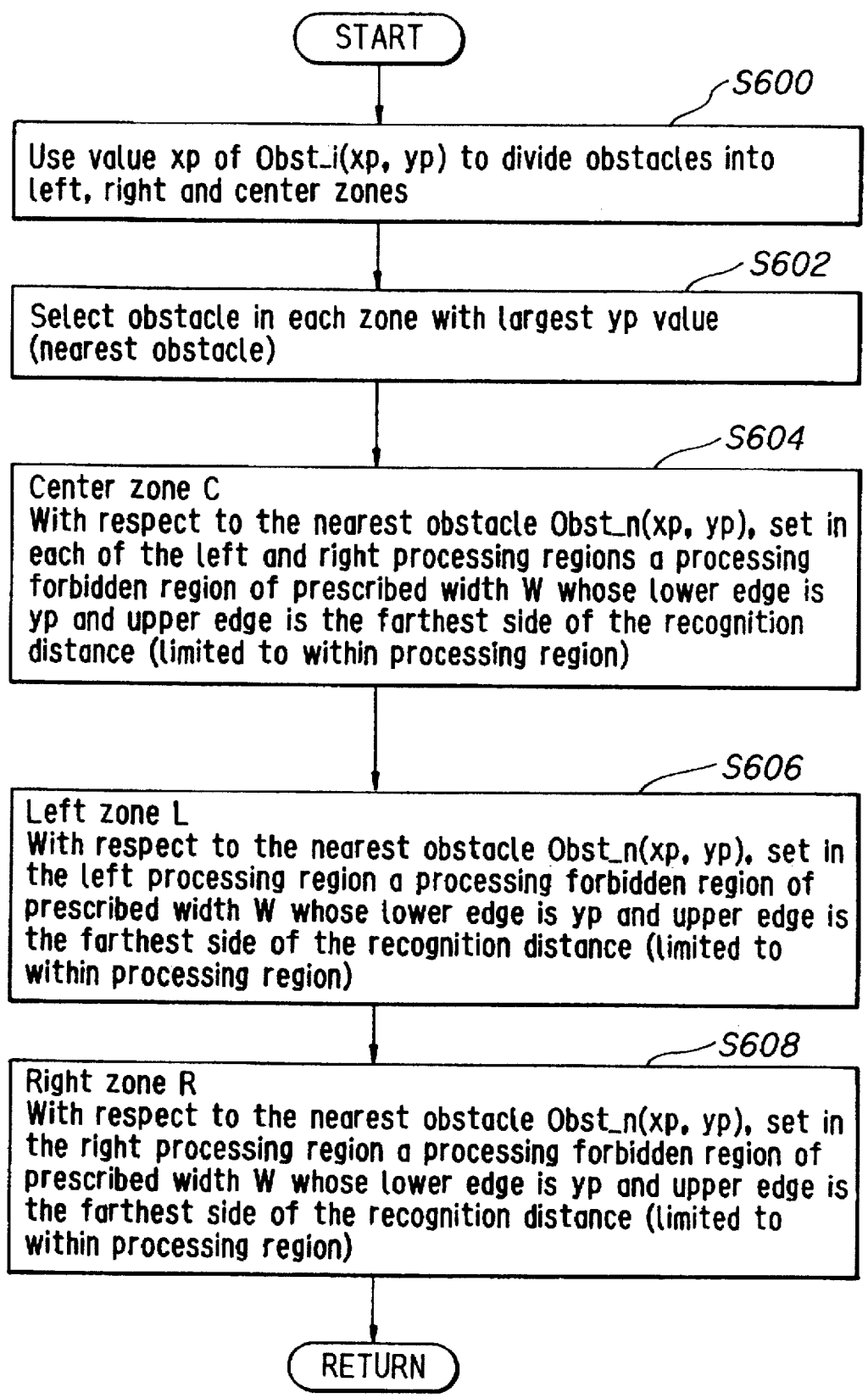
FIG. 27 is a flowchart of a subroutine of the subroutine of FIG. 22 for setting processing forbidden regions when historical information is not available but obstacle data are available.

Next, in S404, a check is made as to whether or not obstacle data are available. If the result is YES, the program advances to S406 in which processing forbidden regions are set with respect to the left and right processing regions based on the obstacle position. The obstacle referred to here is the preceding vehicle or the like read in S16 of FIG. 5. The subroutine for this processing is shown by the flowchart of FIG. 27. The operation is explained in FIG. 28.

In the subroutine of FIG. 27, the obstacle positions are divided into left, right and center zones (S600), the nearest obstacle in each zone is selected (S602), and processing forbidden regions of prescribed width W are set in the respective zones (S604, S606, S608). Since no historical information is available, the processing forbidden regions are centered on the obstacles.

Again returning to FIG. 22, if S400 finds that historical information is available, a check is made in S408 as to whether or not obstacle data are available, and if the result is NO, the program advances to S410 in which left and right processing regions are set using a predefined detection distance and the historical information. The subroutine for this processing is shown by the flowchart of FIG. 29 and the operation is explained in FIG. 30.

Figure 29:
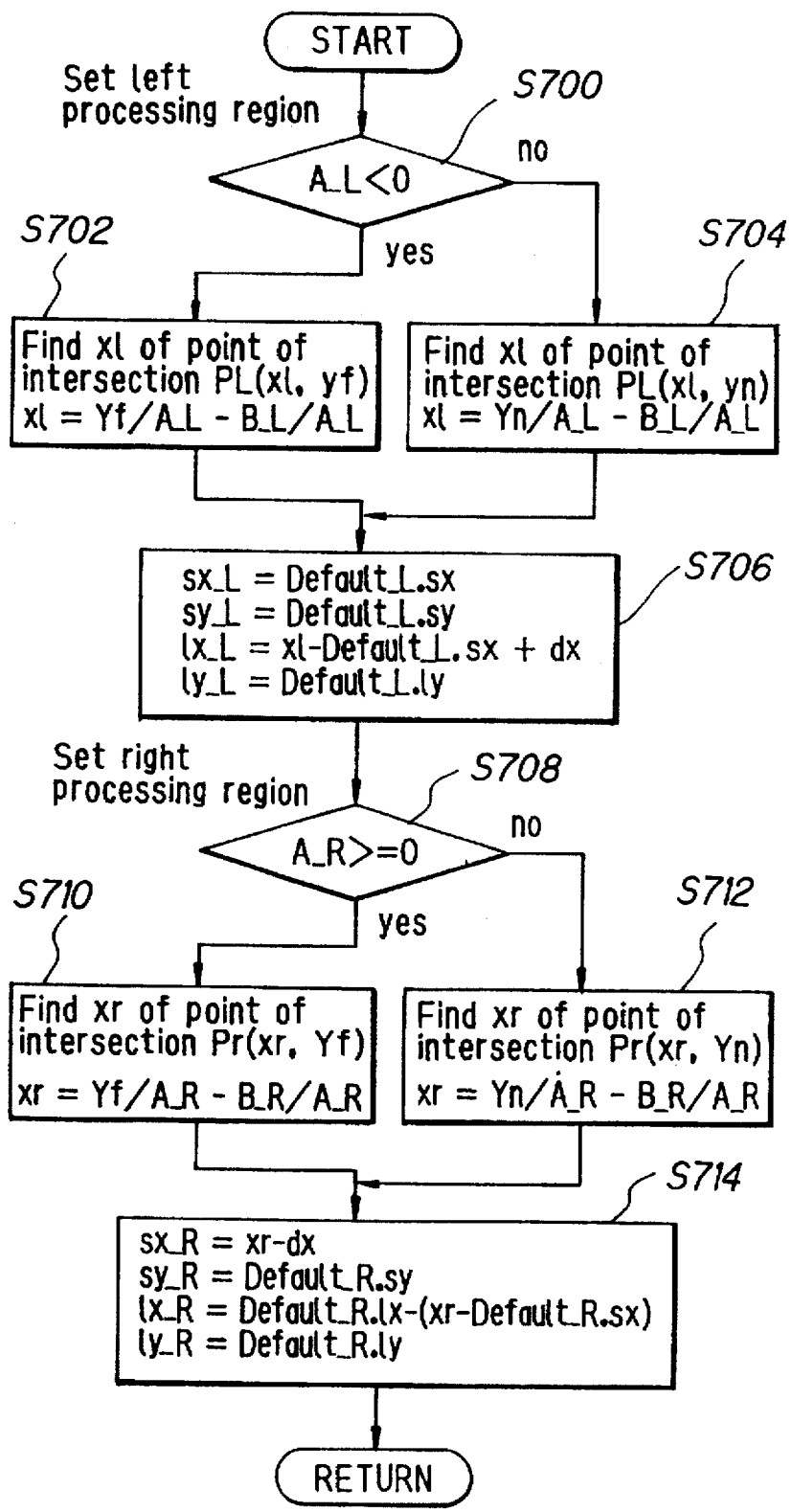
FIG. 29 is flowchart of a subroutine of the flowchart of FIG. 22 for setting the processing regions when historical information is available but obstacle data are not available.
Figure 30:
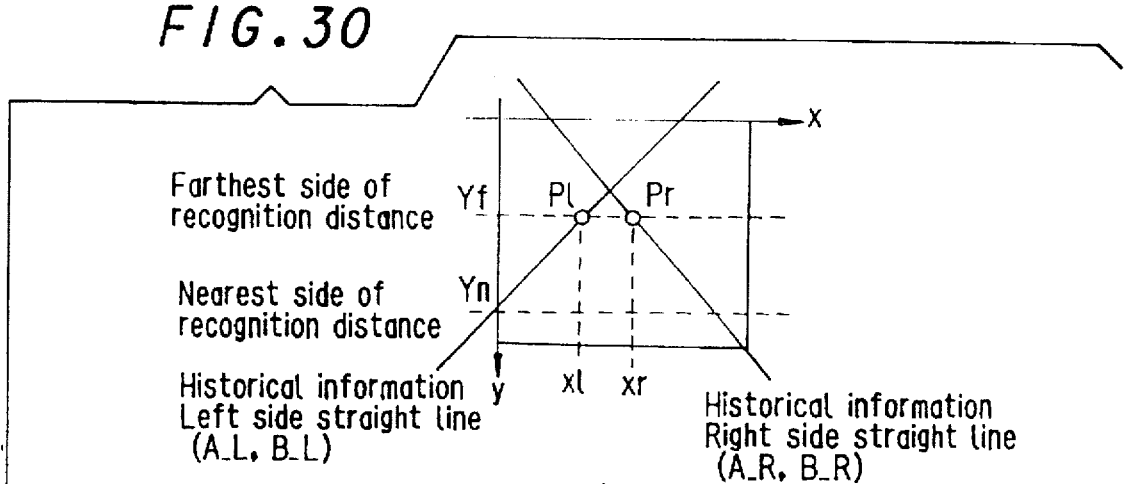
FIG. 30 is a diagram comprising FIGS. 30A, 30B and 30C for explaining the subroutine according to FIG. 29.
Figure 30A:
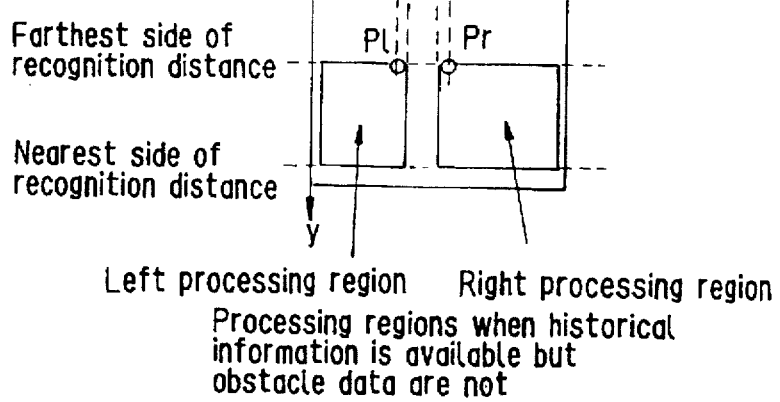
Figure 30C:
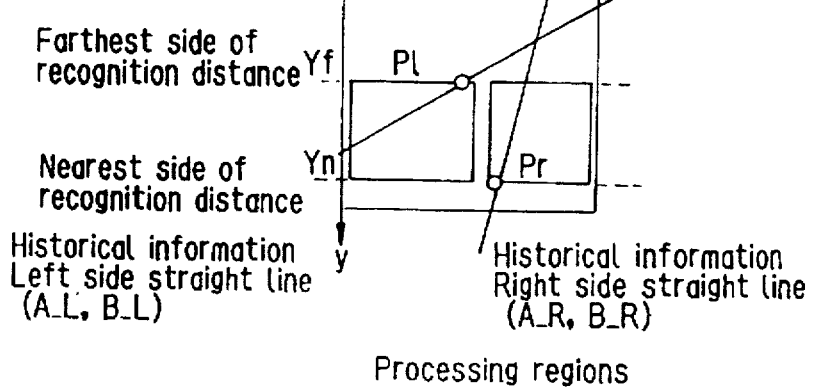

In FIG. 29, the predefined detection distance and the slopes and intercepts represented by left and right straight lines are used, first to set a left side processing region according to the direction of the slope by calculating the intersection with the detection distance (S700, S702, S704 and S706) and then to set a right side processing region by similar processing (S708, S710, S712 and S714). Since no obstacle is present in this case, the set regions are substantially the same as those that would be set in S402.

Figure 31:
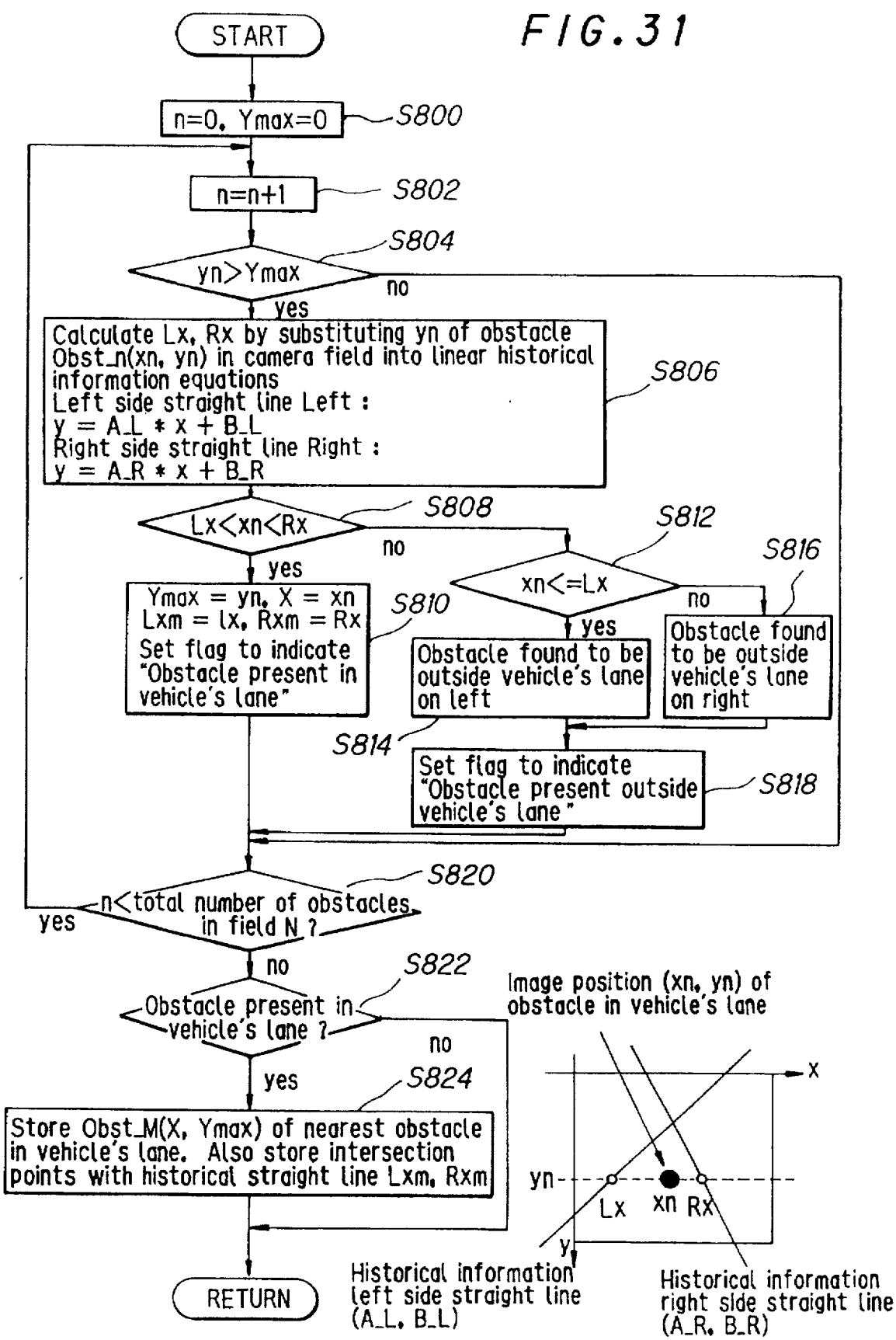
FIG. 31 is a flowchart of a subroutine of the flowchart of FIG. 22 for finding the nearest obstacle in the vehicle's lane.

In FIG. 22, if S408 finds that obstacle data are available, S412 makes a search for the closest obstacle in the vehicle's lane. The subroutine for this operation is shown by the flowchart of FIG. 31.

In this subroutine, a counter value is initialized (S800), the value is incremented by 1 (S802), the y-axis value yn of an obstacle in the camera field is confirmed to be less than Ymax (value on the y-axis of the nearest obstacle in the vehicle's lane; explained later) (S804), yn is substituted into the historical information linear equations to obtain x-axis values Lx, Rx (S806), a check is made as to whether or not the x-axis value xn of the obstacle falls between Lx and Rx (S808) and, if it does, a flag indicating that an obstacle is present in the vehicle's lane is set (S810). If it does not, values xn and Lx are compared (S812), whether the obstacle is to the left or right of the vehicle's lane is detected from the result and a flag is set indicating "Obstacle present outside vehicle's lane" (S814, S816, S818).

It is then confirmed that all obstacles in the camera field have been found and, if any was, information on the x- and y-axes positions of the nearest object in the vehicle's lane is stored, whereafter the points of intersection Lxm, and Rxm with the historical straight lines are stored (S820, S822 and S824). The nearest obstacle is found because distant ones do not hinder the detection.

The program then advances to S414 in the subroutine of FIG. 22, where it is determined from the aforesaid flag whether or not an obstacle is present in the vehicle's lane. If the result is YES, left and right processing regions are set in S416 using the distance to the nearest obstacle in the vehicle's lane and the historical information. The subroutine for this processing is shown by the flowchart of FIG. 32 and the operation is explained in FIG. 33.

Figure 32:
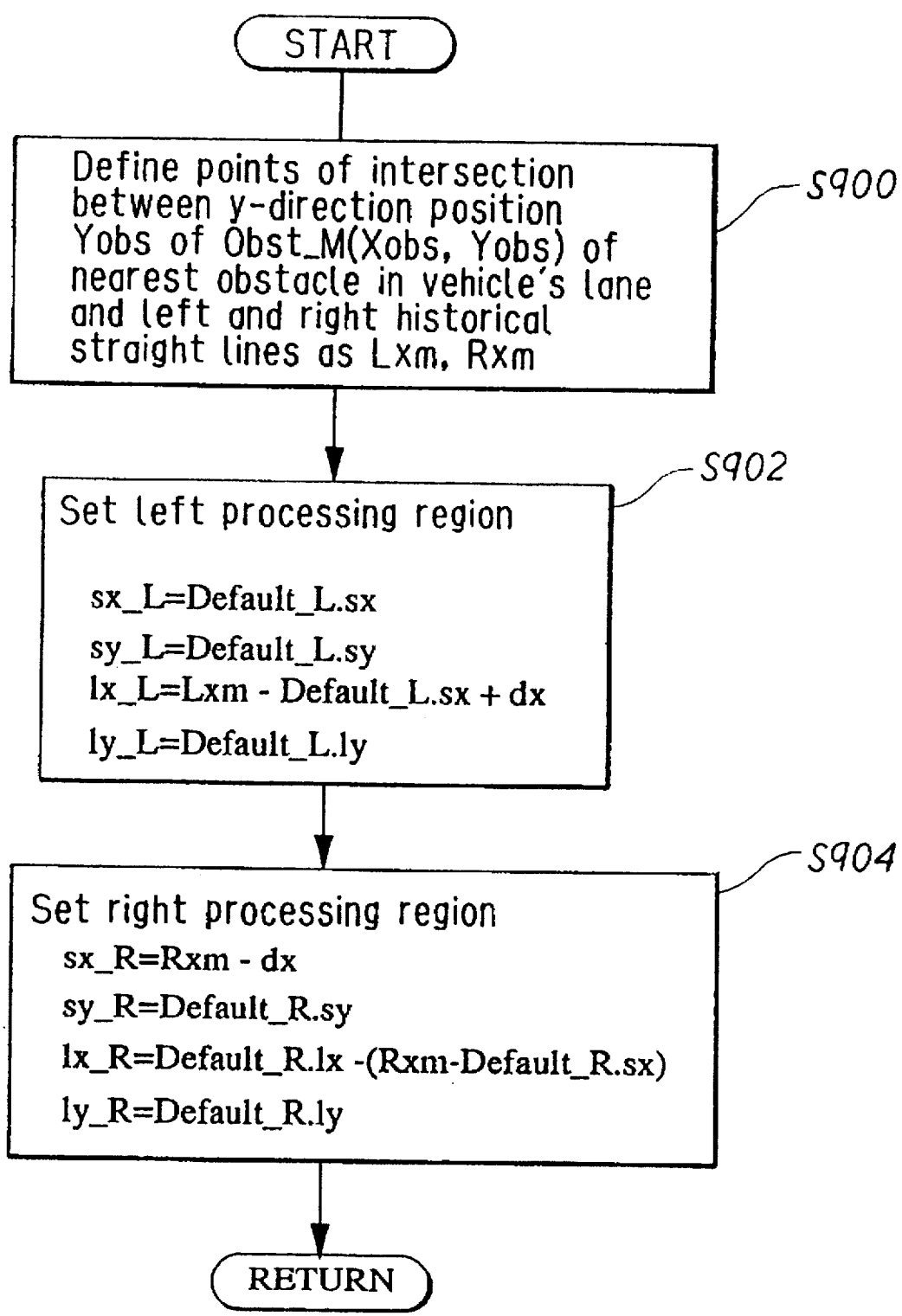
FIG. 32 is a flowchart of a subroutine of the flowchart of FIG. 22 for setting the processing regions when historical information and data on obstacles in the vehicle's lane are available.

According to the procedures mentioned from S900 to S904 of FIG. 32, the left and right processing regions are set as shown in FIG. 33 so as to avoid a region in the vicinity of the obstacle, namely, a region in which the obstacle interferes with detection of the lane boundaries. Thus in this way a processing forbidden or prohibited range is set between the left and right regions with the obstacle as a reference.

In FIG. 22, if S414 finds that no obstacle is present in the vehicle's lane, left and right processing regions are set in S418 using the predefined detection distance and historical information, in the same manner as in S410.

Next, in S420, a check is made as to whether or not an obstacle is present outside the vehicle's lane and, if the result is YES, the program advances to S422 in which processing forbidden regions are set with respect to the established right and left processing regions based on the positions of obstacles present outside the vehicle's lane. The details of this operation are shown in the subroutine flowchart of FIG. 34 and explained in FIG. 35. Specifically, a discrimination is made as to whether the obstacle outside the vehicle's lane is to the left or right (S1000), the nearest obstacle is selected (S1002), and processing forbidden regions of a prescribed width W are set (S1004, S1006).

The program then moves to S20 in the main routine of FIG. 5, where Hough transformation constraints are specified using historical information. This is aimed at eliminating the effect of irregularly appearing shadows, road markers and the like by using the historical information in image data evaluation to conduct preferential segment detection of at least the estimated lane boundaries of the vehicle's lane. It is also for detecting new lane boundaries as they become visible at the time of lane pattern changes or the like.

The purpose of this processing will first be explained with reference to FIG. 36. As illustrated, when an image of a road including a shadow or mark is processed by Hough transformation, the shadow or mark makes it difficult to extract the lane boundaries. At the bottom of FIG. 36 is shown the Hough transformation (rho, θ) mapping plane obtained when the image is processed. It will be noted that the peak corresponding to the bottom line on the right side of the vehicle's lane is hard to discern. This is because a large number of peaks of about the same magnitude are caused by the road markers.

For overcoming this problem, it suffices to estimate the position of the lane boundaries in the current cycle from the results in the preceding cycle and obtain Hough transformation results only in the vicinity of the corresponding peaks. However, since tracking only the same lane boundaries as in the preceding cycle makes it impossible to discover new lane boundaries, it becomes difficult to cope with lane pattern changes and lane branching. The current step is for overcoming this problem.

Figure 37:
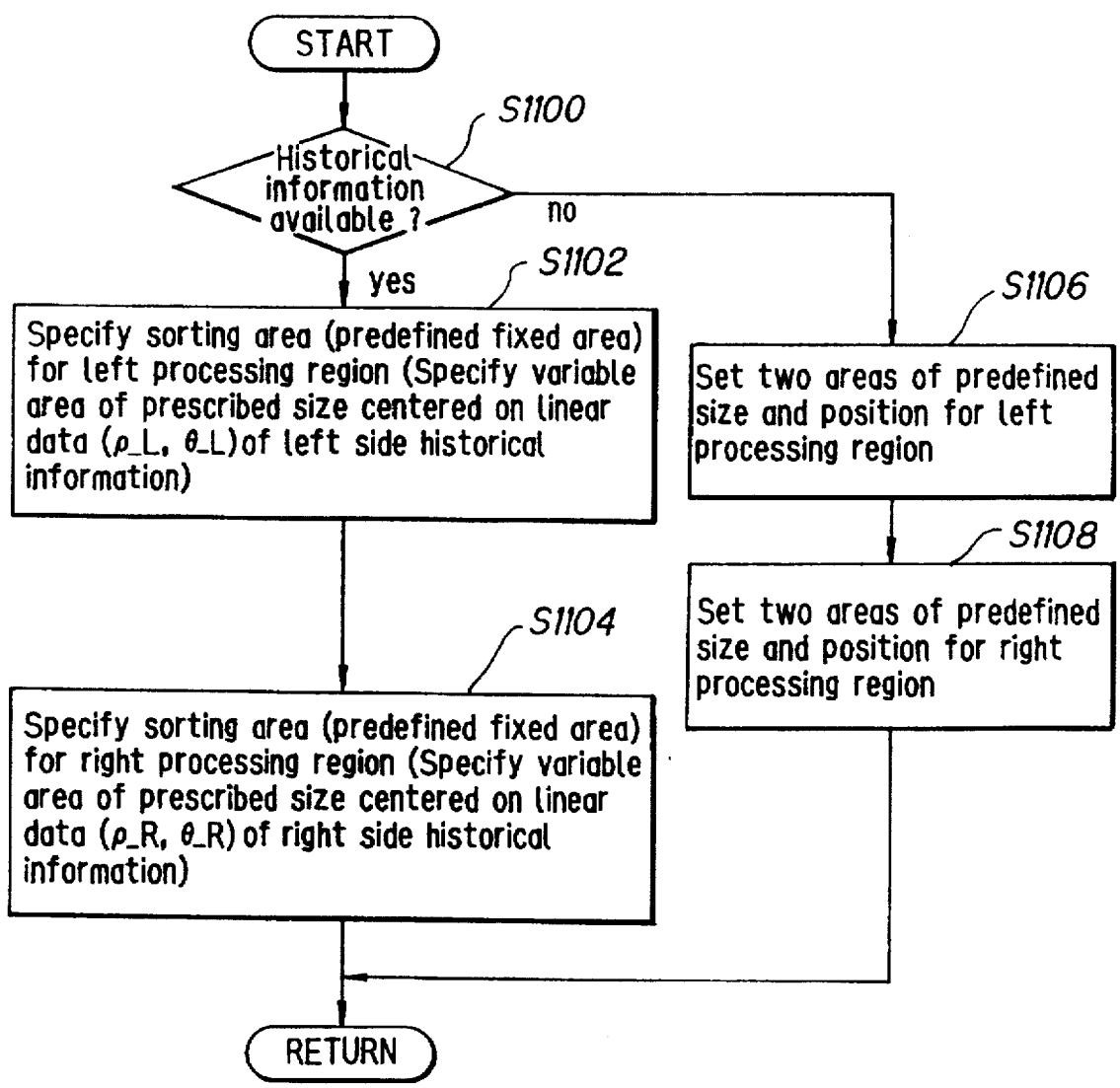
FIG. 37 is a flowchart of a subroutine of the main routine of FIG. 5 for specifying Hough transformation constraints using historical information.

The subroutine for this operation is shown by the flowchart of FIG. 37. First, in S1100, a check is made as to whether or not historical information is available and, if the result is YES, the program advances to S1102 and S1104 in which sorting areas for the left and right processing regions are specified. These comprise of predefined fixed areas and variable areas of prescribed size centered on the straight line data of the left and right side historical information. This is illustrated in FIG. 38.

In this embodiment, the variable areas are set to a width of rho : 32 [dot], θ : 10 [deg] centered on (rho, θ) of the historical information. The fixed areas are set in the range of (rho : 100–480 [dot], θ : 98–116 [deg]) and (rho : 100–480 [dot], θ : 65–82 [deg]). If S1100 finds that no historical information is available, two areas of predefined range are set in the left and right processing regions in S1106 and S1108. Specifically, fixed areas are set in the same manner as above, while (rho : 10–380 [dot], θ : 110–179 [deg]) and (rho : 10–380 [dot], θ : 1–70 [deg]) in place of the variable areas.

The foregoing will be amplified with reference to FIG. 39. Sorting areas are set in the Hough transformation (rho, θ) plane of the current cycle to a prescribed width centered on the historical information (rho, θ). As illustrated, since new lane boundaries coming into view can be expected to appear at the horizon, i.e. since it is possible to discover new road edges at values of θ in the vicinity of 90 [deg], the sorting areas are permanently set at fixed widths. (As will be explained later, straight lines are extracted from the largest to fiftieth largest peaks in the Hough transformation-processed variable and fixed sorting areas.)

Figure 40:
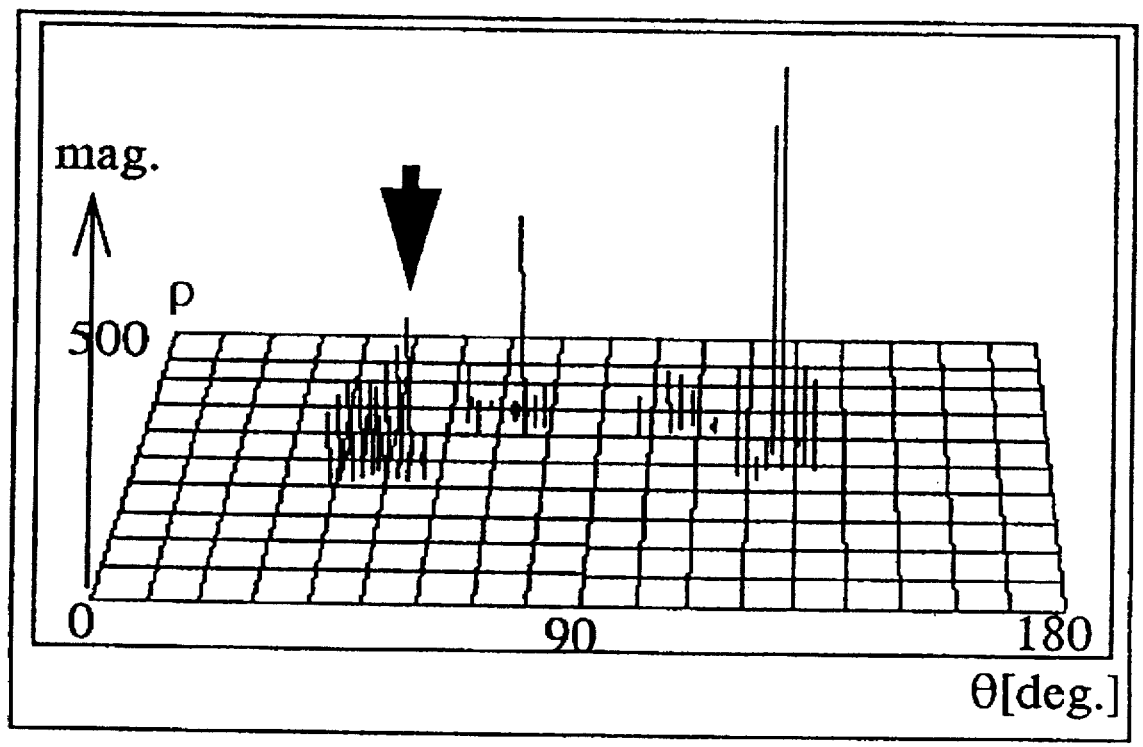
FIG. 40 is a graph showing the Hough transformation results when the method according to the subroutine of FIG. 37 was applied to the road image of FIG. 36.

FIG. 40 shows the results of Hough transformation when the present method is applied to the road image of FIG. 36. It will be noted that the peak corresponding to the broken line can be easily distinguished. Thus the estimated lane boundaries are preferentially extracted from the Hough transformation results using the historical information from the image data evaluation and, similarly, preferential extraction is also conducted in the vicinity of the horizon where the probability of detecting new lane boundaries is high. As a result, it is possible to detect the lane in which the vehicle is traveling with high stability while also maintaining flexibility in response to changes in the lane pattern or in the number of lanes.

The program proceeds to S22 in the main routine of FIG. 5 in which the image is input and its edges are detected. Specifically, the CCD camera 10 (image sensor) views a roadway scene in front of the vehicle and the analog NTSC video signal output by the CCD camera (monochrome TV camera) 10 is converted to a 512×512 pixels, 8-bit quantized digital image. The digital image is imparted with a time delay of the required number of lines (three lines in this embodiment) and input for edge detection processing. In this embodiment, a sobel operator was used for the edge detection procession. The edge detection processing results were output as a 512×512 edge image represented at an edge intensity of 8 bits (256 magnitude levels). No particular preprocessing for correction of pixel intensity or noise reduction was conducted. This is because the straight line extraction capability of Hough transformation is very robust to noise and, further, because influence from shadows and road markers other than lane boundaries is adequately prevented by the provision of the constraints at the time the results are selected.

Next, in S24, the edge points in the processing region are Hough transformed. Specifically, in each of the left and right processing regions the edge points of the edge detection processed digital image data having magnitude exceeding the threshold value SLD of the processing region concerned are Hough transformed (according to the "Ohtsu Threshold Value Determination Method," described, for example, in *Image Analysis Handbook*, P503 (University of Tokyo Publishing Society). The edge points in the processing forbidden regions are not processed.

Next, in S26, representative lines are selected from the Hough transformation results of the left and right regions by clustering. This is for picking out the lane boundaries, i.e. the main line segments, by statistically sorting the group of detected straight lines obtained by Hough transforming a road image such as shown in FIG. 41.

Specifically, when Hough transformation, which amounts to macroscopic straight line extraction processing, is applied to an actual road image, the sharply defined, long lane boundaries appear as large peaks, as shown at the lower part of FIG. 41, and a large number of straight lines are derived and detected. Because of this, it is not possible to obtain the desired road lane boundaries merely by selecting the peaks in order starting with the largest. It is therefore necessary to sort the group of many detected straight lines based on some characteristic so as to narrow them down to only the representative straight lines. However, no completely effective method of sorting (clustering) the detected straight lines obtained by Hough transformation can be found among the prior art furthermost neighbor method, cluster radius designation or K-mean methods.

When these three methods were tested and compared, the K-mean method was found to produce the most natural cluster division results. In addition, with the K-mean method the number of clusters can be increased or decreased merely by changing the value of K, while with the other methods it is not clear how many clusters will result until the processing is completed. In view of the foregoing, the clustering method for extracting road lane boundary values was based on the K-mean method, but the number of clusters K thereof was controlled based on the standard deviation within the clusters of the K number of clusters and the capability to unite proximate clusters was added.

Figure 42:
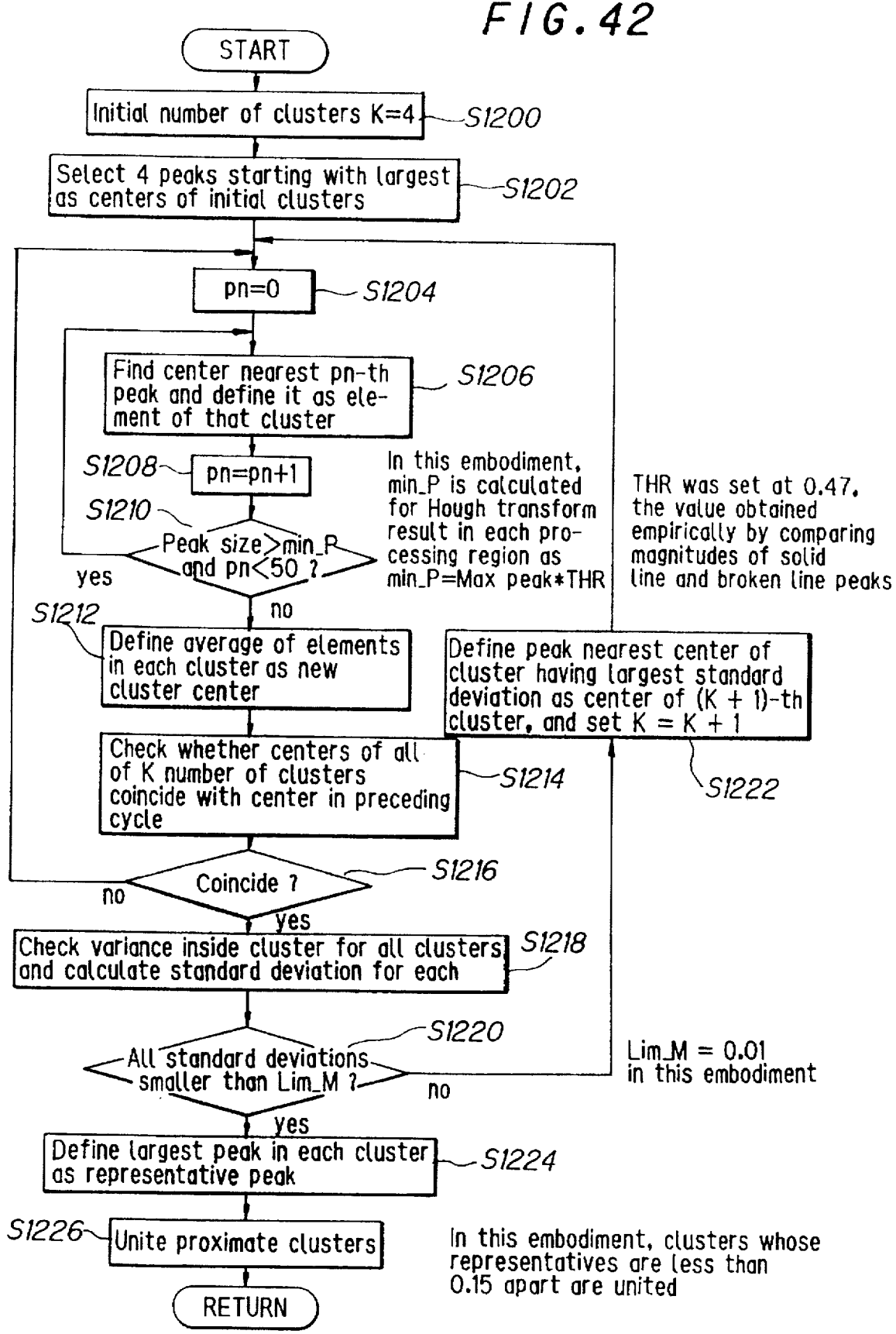
FIG. 42 is a flowchart of a subroutine of the main routine of FIG. 5 for selecting representative lines from the Hough transformation result by clustering.
Figure 43:
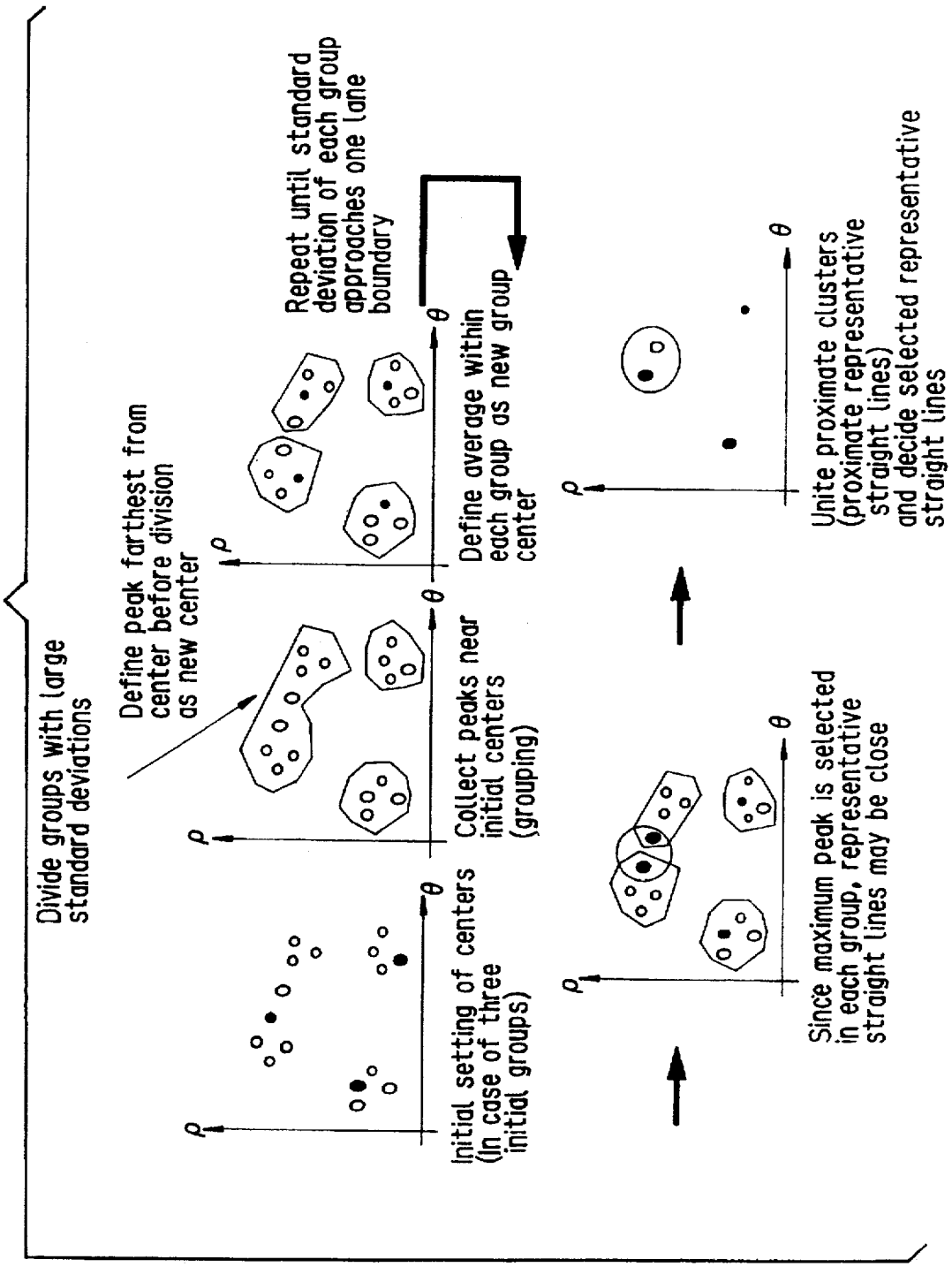
FIG. 43 is a diagram outlining the subroutine according FIG. 42.

S1200 to S1226 of the flowchart of FIG. 42 indicate the operation for clustering the straight line group detected by Hough transformation. FIG. 43 is a diagram outlining the method used. The procedure, which will not be explained in detail, comprises of evaluating the clustering results by the K-mean method based on the standard deviations within the individual clusters and repeating the processing while increasing/decreasing K (number of clusters).

It is therefore not necessary to know the number of lanes in advance and, moreover, response can be made flexibly to changes in the lane pattern. As the standard deviation used as the yardstick for cluster division and the distance threshold value for uniting proximate clusters, there can be values determined by experiment for an actual lane boundary. Because of this, it is possible to achieve sorting well matched to the purpose.

The program next advances to S28 in the main routine of FIG. 5, in which a check is made for misdetection of the boundaries of the vehicle's lane using road (lane) width.

This is for checking based on the road width whether or not any lines difficult to detect, such as broken lines and worn solid lines, were misdetected. Since, as shown in FIG. 44, the peaks of broken lines resulting from Hough transformation are smaller than those of solid lines (less than 50% of those of solid lines), they are difficult to distinguish from noise, making them susceptible to misdetection. Therefore, as shown in FIG. 45, the straight line nearest the vehicle is found from among those selected by clustering, an opposing estimated straight line at a distance equal to the prescribed road (lane) width is calculated, and a straight line near thereto is found by searching the Hough transformation results down to the smaller peaks.

In this method, if the straight line found has already been detected, this means that this lane boundary had a fair degree of magnitude in the Hough transformation mapping plane. In such case, since the detected straight line can be considered reliable, the road width in the actual plane is calculated from the two straight lines L1 and L3 and this new road width is used thereafter. The method can therefore deal with changes in road width or some degree of difference between the actual road width and the initially set value.

The program proceeds to S30 of the main routine of FIG. 5 in which the matching between the representative segments and the edge image is checked.

If the straight lines detected by Hough transformation are used as they are as the lane boundaries, line segments which do not match with the actual lane boundaries will be included at branch lanes leading to exit ramps and the like. For avoiding this, earlier technologies such as the University of Maryland's DARPA road edge detection image processing method for ALV (Optical Engineering, March 1986, Vol. 25, No. 3, pp. 409–414) have required sequential processing of small processing regions.

Figure 46:
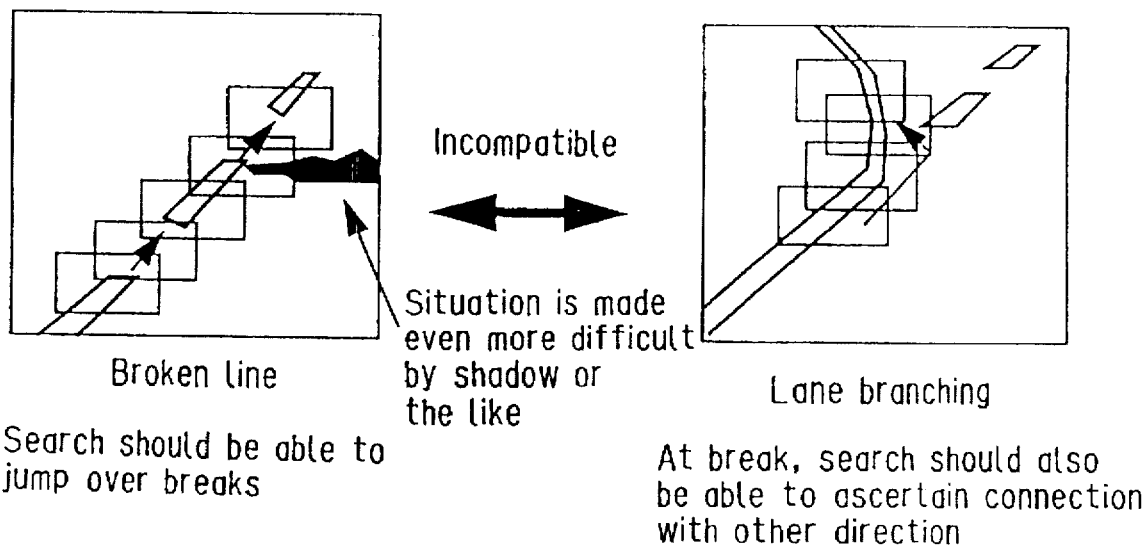
FIG. 46 is a diagram for explaining the basis of the step in the main routine of FIG. 5 for checking the matching between representative segments and an edge image.

This has been an obstacle to shortening processing time because it requires Hough transformation, which accounts for a large proportion of the processing time even when high speed hardware is employed, to be conducted sequentially a large number of times. As shown in FIG. 46, moreover, when small regions are searched, a method capable of coping with broken lines has difficulty coping with curves, and vice versa. In addition, susceptibility to influence from shadows and road markers is high, making matters difficult without macroscopic information.

Figure 47:
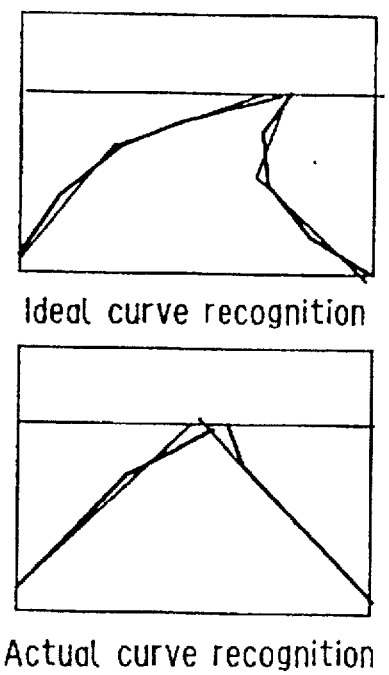
FIG. 47 is a diagram for explaining ideal and actual curve recognition, assuming the basis of the step in the main routine of FIG. 5 for checking the matching between representative segments and an edge image.

While road edges can be recognized by straight line segment approximation in the case of an ideally shaped curve as shown at the top in FIG. 47, most curves of an actual expressway are gentle (radius of curvature of 400 m or more) so that the image becomes the same as one for a straight road, as shown at the bottom in FIG. 47. Since the prior art therefore recognizes curved road portions as straight ones, sudden changes occur at the time of entering and exiting curves and these become a cause for steering control delay and instability. For overcoming this problem, it is necessary to sequentially inspect the road edges and conduct processing as if tracing the curves. As was explained earlier, however, when sequential inspection type processing using small regions is employed, it is difficult to cope with broken lines, shadows and the like.

In light of this, Japanese Laid-open Patent Application Nos. Hei 3-139706 and Hei 4-36878 teach systems in which the effect of shadows and other such noise is eliminated by setting small processing regions at positions estimated from the processing results in the preceding cycle and curves are coped with by edge inspection and the use of processing regions divided into to far and near sections. However, this method can handle only a prescribed number of lanes and is unable to detect new lane boundaries and lane branches that come into view when changes occur in the lane pattern.

Figure 48:
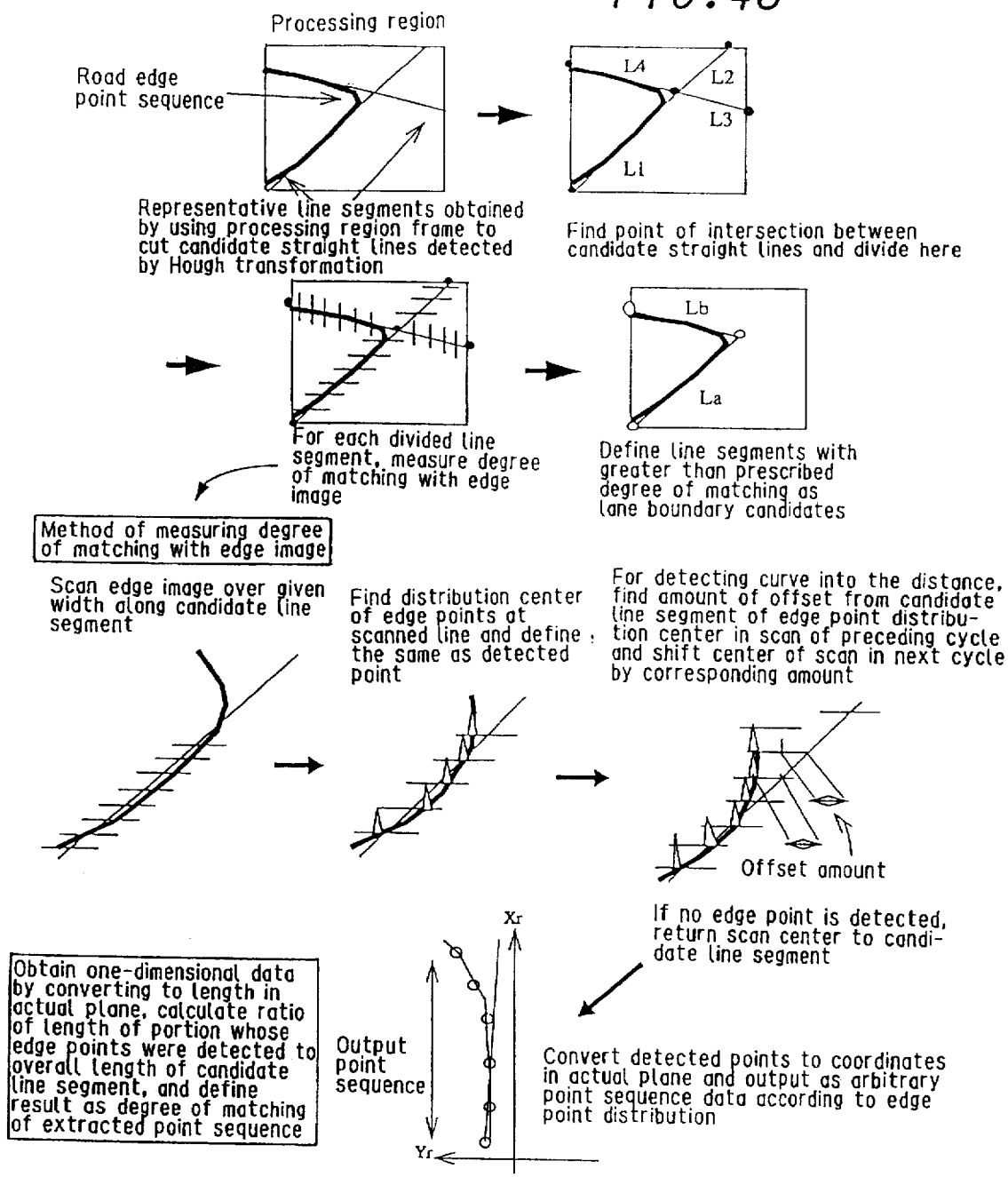
FIG. 48 is a diagram outlining the step in the main routine of FIG. 5 for checking the matching between representative segments and an edge image.
Figure 49:
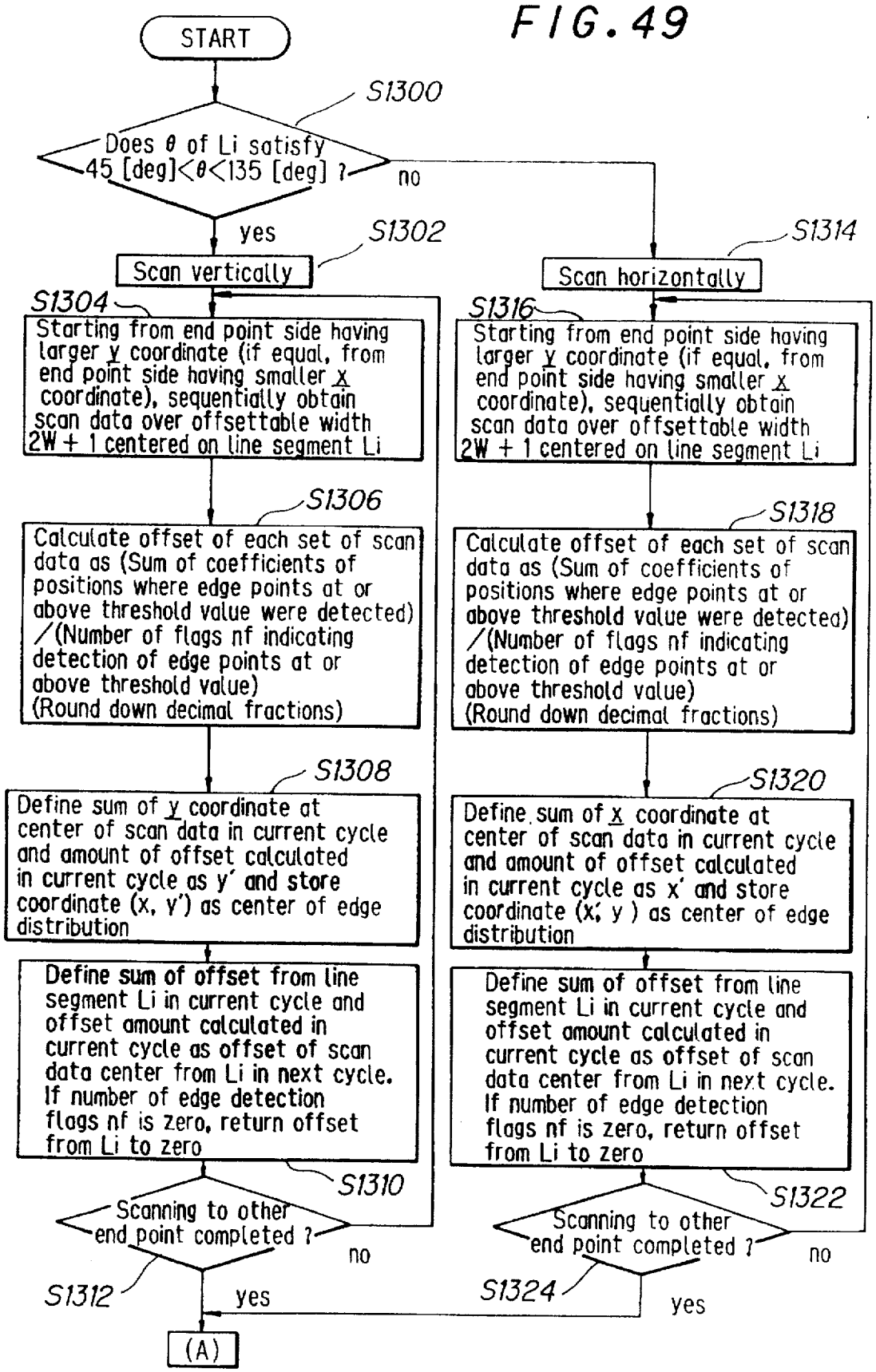
FIG. 49 is the first half of a flowchart of a subroutine explaining the step in the main routine of FIG. 5 for checking the matching between representative segments and an edge image, the explanation centering on comparison between candidate segments and the edge image.
Figure 50:
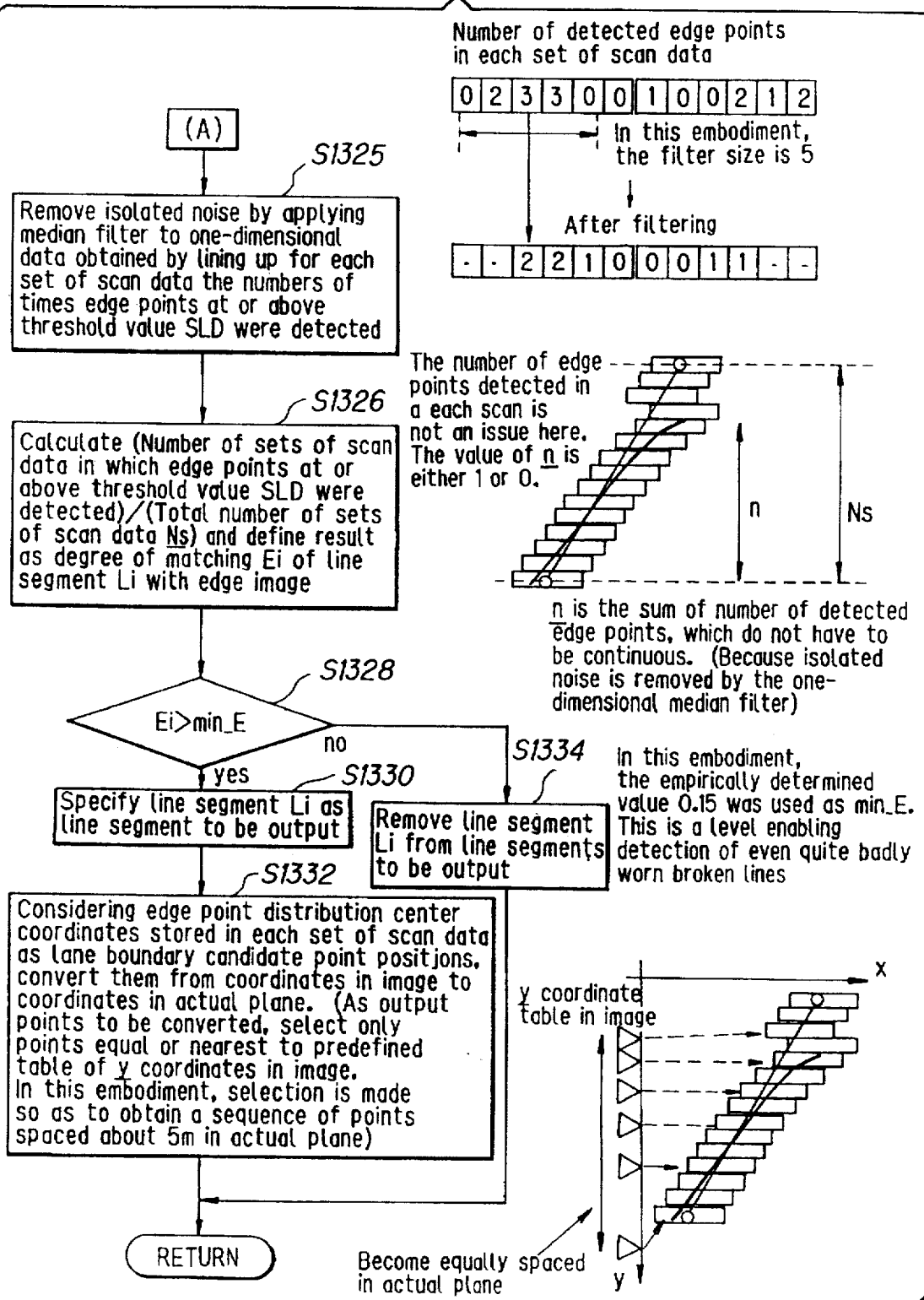
FIG. 50 is the second half of the flowchart of FIG. 49.
Figure 53:
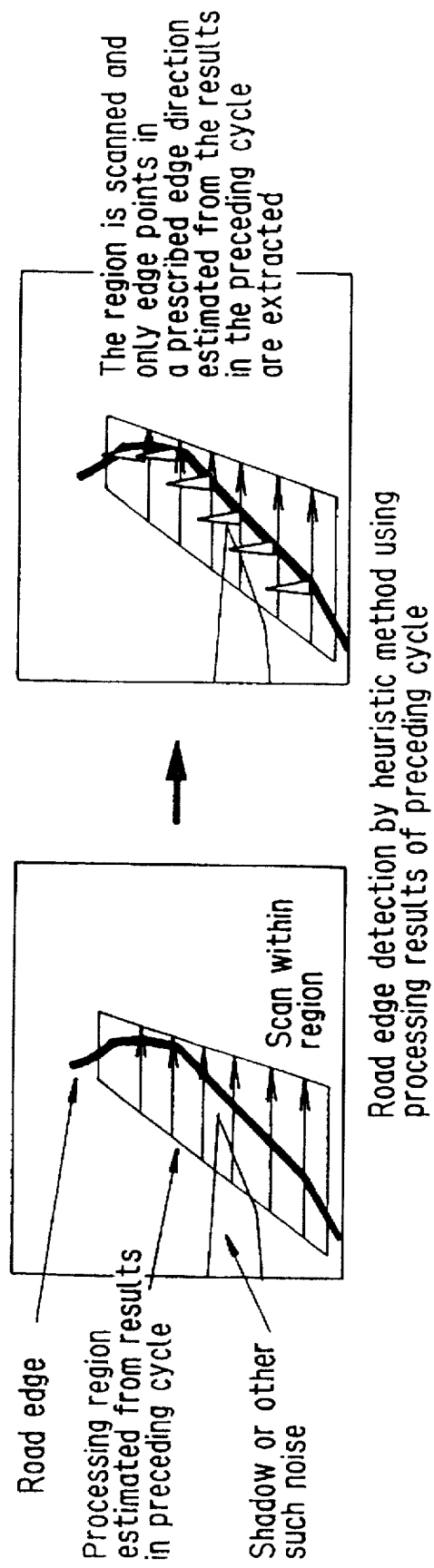
FIG. 53 is a diagram outlining the step in the main routine of FIG. 5 for checking the matching between representative segments and an edge image.
Figure 54:
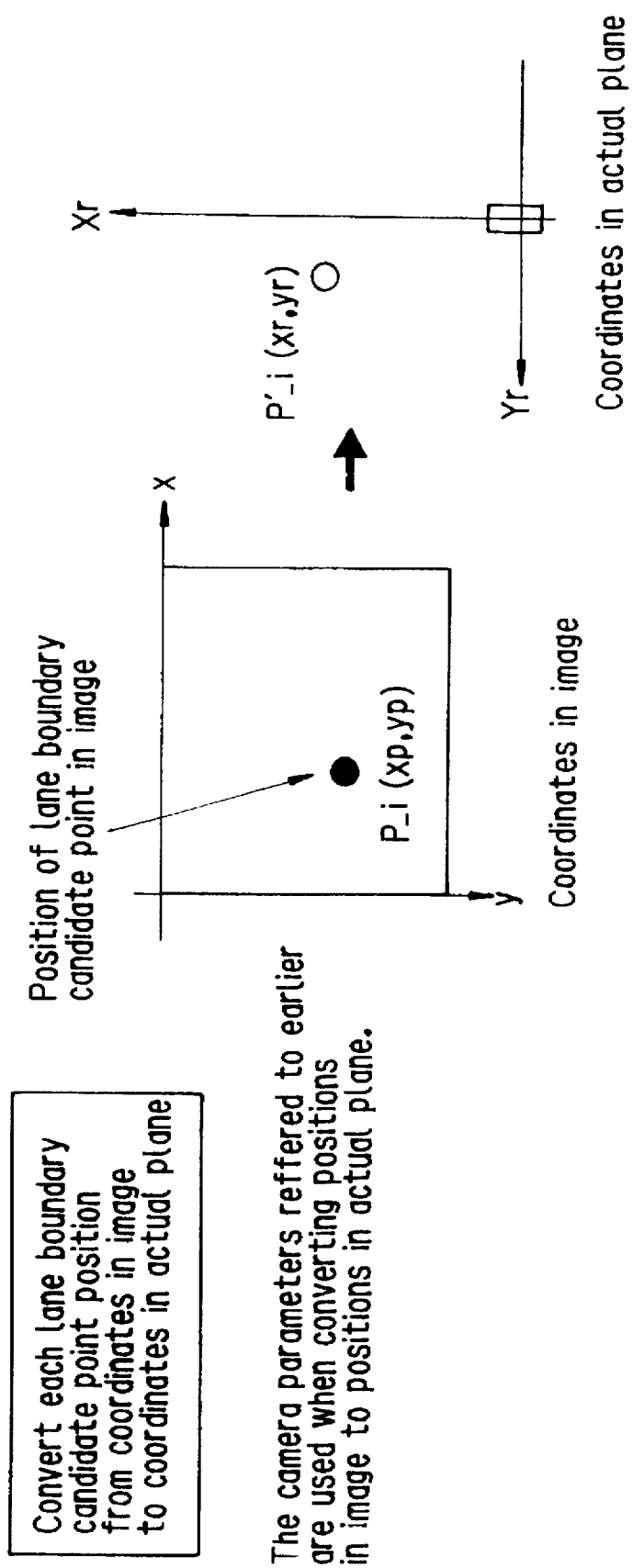
FIG. 54 is a diagram for explaining the conversion of lane boundary candidate point positions from coordinates in the image to coordinates in the actual plane conducted as part of the step in the main routine of FIG. 5 for checking the matching between representative segments and an edge image.
Figure 55:
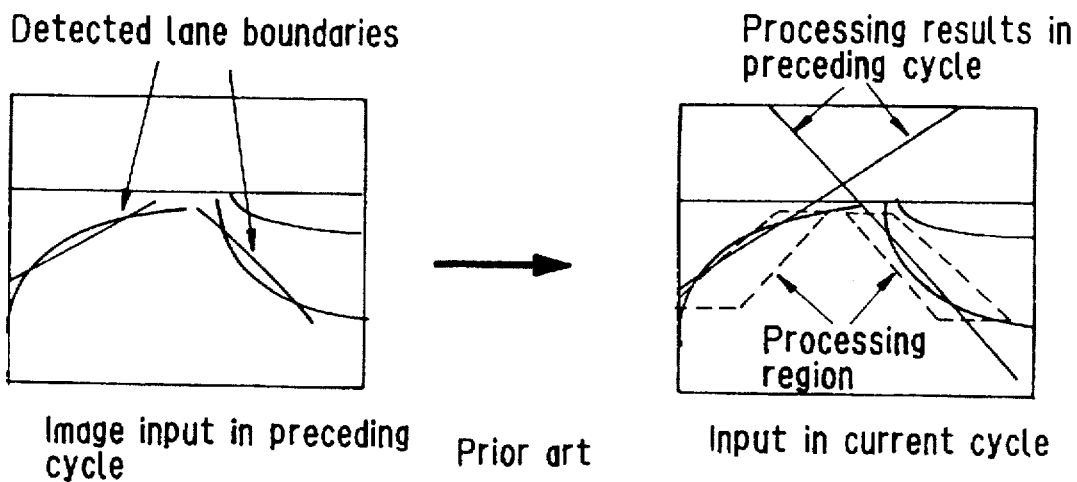
FIG. 55 is a diagram for explaining image processing according to the prior art.
Figure 56:
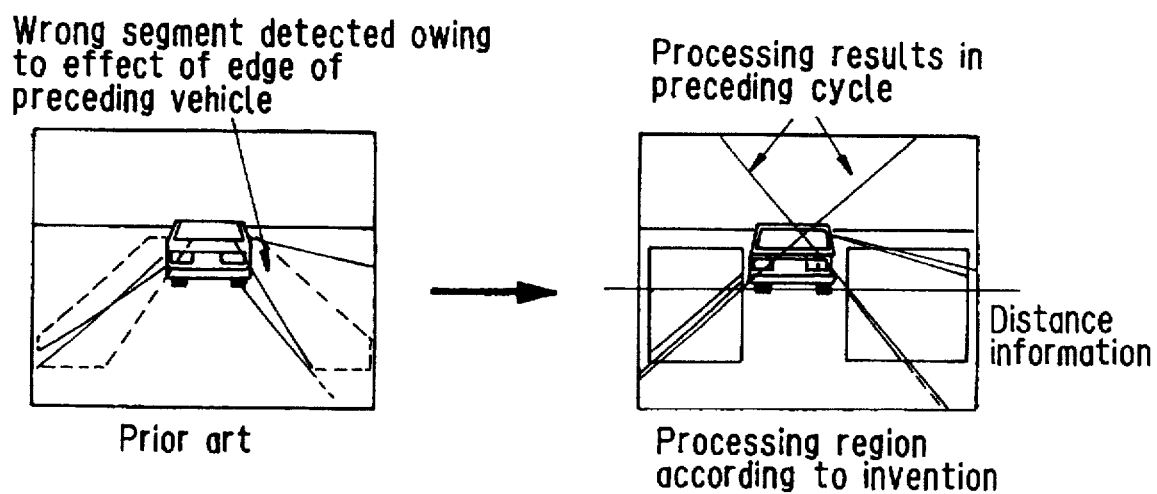
FIG. 56 is a diagram for illustrating a defect of the prior art of FIG. 55 and explaining a first object of the invention.
Figure 57:
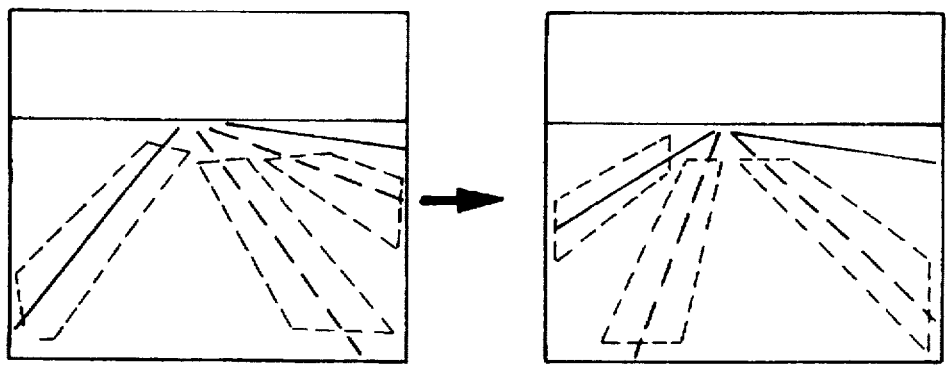
FIG. 57 is a diagram for illustrating a defect of the prior art and explaining a second object of the invention.

This embodiment therefore uses the method shown in FIG. 48. S1300 to S1334 of the flowchart of FIGS. 49 and 50 indicate the operation for checking candidate segments against the edge image based on this method. FIGS. 51 and 52 are diagrams for explaining the subroutine according to FIG. 49. Thus, as shown in FIG. 53, the road edges are detected by a heuristic method using the processing results of the preceding cycle. As shown in FIG. 54, the candidate lane boundary point sequences are converted from coordinates in the image, to coordinates in the actual plane.

As a result of the foregoing, the adverse effect of shadows and road markers is reduced, thereby enabling highly precise lane boundary edge detection processing. Specifically, since the Hough transformation makes it possible to obtain the macroscopic straight lines by processing the whole of a large region at one time, there is no need to limit the number of lanes in advance, so that the aforesaid method is not affected by broken lines or by breaks at curves and is moreover able to faithfully reproduce curves.

Since the aforesaid method requires only detection of the center of edge point distribution on the scanned lines and simple rules for shifting the scanning center, it does not involve any complex conditional branching. Since line segments are obtained by cutting the representative lines selected by clustering after Hough transformation at their intersections, the ensuing processing can be carried out independently for each divided line segment, which makes it possible to achieve high processing speed by processing the segments in parallel. The method is less susceptible to horizontal lines resulting from shadows and the like than is the method of investigating and tracking edge points sequentially and is able to cope with broken lines and breaks without need for complex inspection rules.

The program proceeds to S32 in the main routine of FIG. 5 in which the geometric characteristics of the candidate line segments are determined. This involves determining the geometric characteristics of each segment of the lane boundary candidates detected in S30 with respect to the other such segments and attaching the determined characteristics to the output data. These characteristics include, for example, the angles at which each segment connects with other segments.

Next, broken line discrimination is conducted in S34. This is for increasing road configuration recognition performance by discriminating between broken and continuous lines. The method used is described in detail in the Assignee's Japanese Laid-open Patent Application No. Hei 3-158976 and will not be explained further here.

Next, in S36, the detected lane boundary data is output to the image data evaluation section (the image evaluation CPU 38 in FIG. 2) and the program returns to the beginning of the main routine (to S10).

As explained in the foregoing, in this embodiment image processing regions are set based on historical information and obstacle position so that lane recognition is not affected by the preceding vehicle and other obstacles. As a result, lane recognition errors do not occur when driving behind another vehicle, for example. In addition, since Hough transformation constraints are specified using historical information, changes in the number of lanes can be coped with even in a driving environment with an unknown number of lanes.

While the foregoing embodiment uses a monocular visual sensor, it is alternatively possible to use a binocular visual sensor, which can be used to measure distance, making it possible to omit the front radars.

The present invention has thus been shown and described with reference to the specific embodiments. However, it should be noted that the present invention is in no way limited to the details of the prescribed embodiments; changes and modifications may be made without departing from the scope of the appended claims.

What is claimed is:

1. A system for processing lane images for a vehicle, including:

an image sensor mounted on the vehicle for viewing a roadway scene ahead of the vehicle to output image data of the roadway scene including a lane on which the vehicle travels;

image data processing means for processing the image data to output lane information; and lane recognition means for recognizing the lane on which the vehicle travels based on the output lane information;

wherein the improvement comprises:

obstacle position determining means for determining a position of an obstacle present in the roadway scene;

nearest obstacle selecting means for selecting the position of a nearest obstacle when a plurality of obstacles are present;

15 lane boundary position storing means for storing a lane boundary position estimated up to a preceding image data processing as historical information;

processing region determining means for determining a region of the data image to be processed at least based on the detected position of the nearest obstacle and the historical information such that the region excludes the detected position of the nearest obstacle.

2. A system according to claim 1, wherein said processing region determining means determines the region such that the region is made up of a left half and a right half that overlap partially with each other.

3. A system according to claim 2, wherein said image sensor is a CCD camera.

4. A system according to claim 1, wherein said processing region determining means includes:

area determining means for determining an area in the region;

edge image extracting means for extracting edge images in the image date of the area;

Hough transforming means for carrying out Hough transformation on the edge images;

straight line detecting means for detecting one straight line from among straight lines obtained from the Hough transformation; and said lane recognition means recognizes the lane on which the vehicle travels based on the detected straight line.

5. A system according to claim 4, wherein said image sensor is a CCD camera.

6. A system according to claim 1, wherein said image sensor is a CCD camera.

7. A system for processing lane images for a vehicle, including:

an image sensor mounted on the vehicle for viewing a roadway scene ahead of the vehicle to output image data of the roadway scene including a lane on which the vehicle travels;

image data processing means for processing the image data to output lane information; and lane recognition means for recognizing the lane on which the vehicle travels based on the output lane information;

wherein the improvement comprises:

obstacle position determining means for determining position of an obstacle present in the roadway scene;

processing region determining means for determining a region of the data image to be processed at least based on the detected obstacle position such that the region excludes the detected obstacle position;

said image data processing means includes area determining means for determining an area in the region, edge image extracting means for extracting edge images in the image date of the area, Hough transforming means for carrying out Hough transformation on the edge images, straight line detecting means for detecting one straight line from among straight lines obtained from the Hough transformation, and said lane recognition means recognizes the lane on which the vehicle travels based on the detected straight line;

lane boundary position storing means for storing a lane boundary position estimated up to a preceding image data processing as historical information; and said area determining means determines a first area based on the historical information and a second area based

16 on a position where a new lane boundary can be expected to appear.

8. A system according to claim 7, wherein said area determining means determines the second area based on a position corresponding to a horizon in the roadway scene.

9. A system according to claim 8, wherein said straight line detecting means includes;

setting means initially setting centers of clusters of the straight lines obtained from the Hough transformation;

clustering means for clustering the straight lines obtained from the Hough transformation;

defining means for defining average in each cluster as new centers; and uniting means for uniting proximate cluster to detect said straight line.

10. A system according to claim 7, wherein said straight line detecting means includes;

setting means initially setting centers of clusters of the straight lines obtained from the Hough transformation;

clustering means for clustering the straight lines obtained from the Hough transformation;

defining means for defining average in each cluster as new centers; and uniting means for uniting proximate cluster to detect said straight line.

11. A system for processing lane images for a vehicle, including:

an image sensor mounted on the vehicle for viewing a roadway scene ahead of the vehicle to output image data of the roadway scene including a lane on which the vehicle travels;

image data processing means for processing the image data to output lane information; and lane recognition means for recognizing the lane on which the vehicle travels based on the output lane information;

wherein the improvement comprises:

obstacle position determining means for determining position of an obstacle present in the roadway scene;

processing region determining means for determining a region of the data image to be processed at least based on the detected obstacle position such that the region excludes the detected obstacle position;

said image data processing means includes area determining means for determining an area in the region, edge image extracting means for extracting edge images in the image date of the area, Hough transforming means for carrying out Hough transformation on the edge images, straight line detecting means for detecting one straight line from among straight lines obtained from the Hough transformation, and said lane recognition means recognizes the lane on which the vehicle travels based on the detected straight line;

wherein said straight line detecting means includes setting means initially setting centers of clusters of the straight lines obtained from the Hough transformation, clustering means for clustering the straight lines obtained from the Hough transformation, defining means for defining an average in each cluster as new centers, and uniting means for uniting proximate cluster to detect said straight line.

* * * * *